(12) United States Patent
Batistakis et al.

(10) Patent No.: US 11,880,640 B2
(45) Date of Patent: Jan. 23, 2024

(54) SYSTEMS AND METHODS FOR PREDICTING LAYER DEFORMATION

(71) Applicant: ASML NETHERLANDS B.V., Veldhoven (NL)

(72) Inventors: Chrysostomos Batistakis, Eindhoven (NL); Scott Anderson Middlebrooks, Duizel (NL); Sander Frederik Wuister, Eindhoven (NL)

(73) Assignee: ASML NETHERLANDS B.V., Veldhoven (NL)

( * ) Notice: Subject to any disclaimer, the term of this patent is extended or adjusted under 35 U.S.C. 154(b) by 0 days.

(21) Appl. No.: 18/118,657

(22) Filed: Mar. 7, 2023

(65) Prior Publication Data

US 2023/0222273 A1    Jul. 13, 2023

Related U.S. Application Data

(63) Continuation of application No. 16/763,376, filed as application No. PCT/EP2018/082949 on Nov. 29, 2018, now Pat. No. 11,625,520.

(30) Foreign Application Priority Data

Dec. 4, 2017  (EP) .................................. 17205139
Nov. 28, 2018  (EP) .................................. 18208989

(51) Int. Cl.
*G06F 7/50*       (2006.01)
*G06F 30/28*      (2020.01)
(Continued)

(52) U.S. Cl.
CPC .............. *G06F 30/28* (2020.01); *G03F 7/705* (2013.01); *G06F 2119/14* (2020.01)

(58) Field of Classification Search
USPC ................. 716/50, 51, 52, 53, 54, 55; 703/2
See application file for complete search history.

(56) References Cited

U.S. PATENT DOCUMENTS 7,587,704 B2   9/2009   Ye et al.
8,200,468 B2   6/2012   Ye et al.
(Continued)

FOREIGN PATENT DOCUMENTS

| CN | 100536066 | | 9/2009 | |
|---|---|---|---|---|
| CN | 100536066 C | * | 9/2009 | ........... G03F 7/2041 |

(Continued)

OTHER PUBLICATIONS

International Search Report and Written Opinion issued in corresponding PCT Patent Application No. PCT/EP2018/082949, dated Jan. 7, 2019.

(Continued)

*Primary Examiner* — Brian Ngo
(74) *Attorney, Agent, or Firm* — Pillsbury Winthrop Shaw Pittman, LLP

(57) ABSTRACT

A method involving obtaining a resist deformation model for simulating a deformation process of a pattern in resist, the resist deformation model being a fluid dynamics model configured to simulate an intrafluid force acting on the resist, performing, using the resist deformation model, a computer simulation of the deformation process to obtain a deformation of the developed resist pattern for an input pattern to the resist deformation model, and producing electronic data representing the deformation of the developed resist pattern for the input pattern.

20 Claims, 19 Drawing Sheets

(51) Int. Cl.
    *G03F 7/00*          (2006.01)
    *G06F 119/14*     (2020.01)

(56)              References Cited

U.S. PATENT DOCUMENTS

| | | |
|---|---|---|
| 2005/0076322 A1 | 4/2005 | Ye et al. |
| 2008/0021587 A1* | 1/2008 | Wu ................... G03F 7/0002 |
| | | 700/121 |
| 2014/0362354 A1* | 12/2014 | Nishino ............ G03F 7/70341 |
| | | 355/30 |
| 2018/0095450 A1* | 4/2018 | Lappas .................. G06T 19/00 |

FOREIGN PATENT DOCUMENTS

| | | | |
|---|---|---|---|
| DE | 20122196 | 10/2004 | |
| DE | 20122196 U1 * | 10/2004 | ......... B29C 35/0888 |
| WO | 2010051099 | 5/2010 | |
| WO | WO-2010051099 A1 * | 5/2010 | ......... G01N 33/5008 |
| WO | 2016146355 | 9/2016 | |

OTHER PUBLICATIONS

Taiwanese Office Action issued in corresponding Taiwanese Patent Application No. 107143201, dated Jun. 19, 2019.
Chinese Office Action issued in corresponding Chinese Patent Application No. 201880078584.0, dated Mar. 3, 2022.

\* cited by examiner

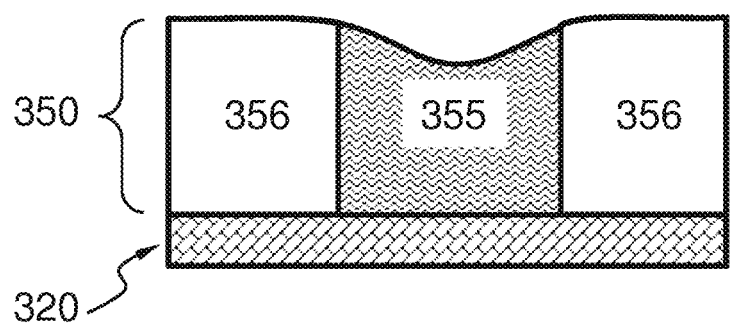
Fig. 4A
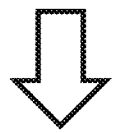
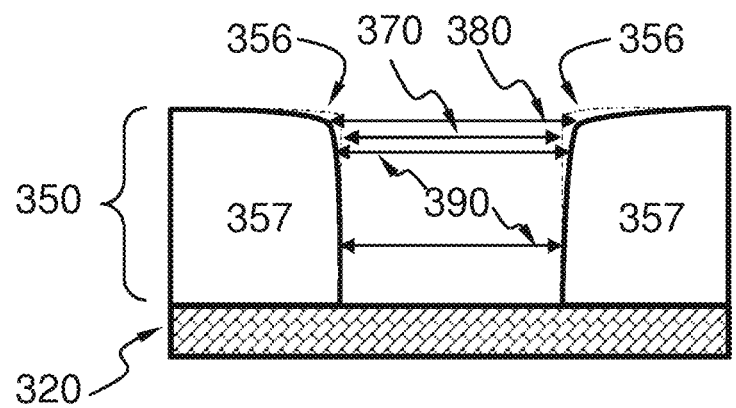
Fig. 4B

SYSTEMS AND METHODS FOR PREDICTING LAYER DEFORMATION

This application is a continuation of pending U.S. patent application Ser. No. 16/763,376, filed May 12, 2020, which is the U.S. national phase entry of PCT Patent Application No. PCT/EP2018/082949, filed Nov. 29, 2018, which claims the benefit of priority of European Patent Application No. 17205139.3, filed Dec. 4, 2017, and of European Patent Application No. 18208989.6, filed Nov. 28, 2018, each of the foregoing applications is incorporated herein in its entirety by reference.

TECHNICAL FIELD

The description herein relates to processes involving pattern formation on a substrate, and more particularly to a method of determining deformation of a patterned layer on the substrate.

BACKGROUND

A lithographic apparatus can be used, for example, in the manufacture of integrated circuits (ICs) or other devices. In such a case, a patterning device (e.g., a mask) may contain or provide a pattern corresponding to an individual layer of the device ("design layout"), and this pattern can be transferred onto a target portion (e.g. comprising one or more dies) on a substrate (e.g., silicon wafer) that has been coated with a layer of radiation-sensitive material ("resist"), by methods such as irradiating the target portion through the pattern on the patterning device. In general, a single substrate contains a plurality of adjacent target portions to which the pattern is transferred successively by the lithographic apparatus, one target portion at a time. In one type of lithographic apparatus, the pattern on the entire patterning device is transferred onto one target portion in one go; such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the pattern on the patterning device are transferred to one target portion progressively. Since, in general, the lithographic apparatus will have a magnification factor M (generally <1), the speed F at which the substrate is moved will be a factor M times that at which the projection beam scans the patterning device.

Prior to the device fabrication procedure of transferring the pattern from the patterning device to the substrate of the device manufacturing process, the substrate may undergo various device fabrication procedures of the device manufacturing process, such as priming, resist coating and a soft bake. After pattern transfer, the substrate may be subjected to other device fabrication procedures of the device manufacturing process, such as a post-exposure bake (PEB), development, a hard bake and measurement/inspection of the transferred pattern. This array of device fabrication procedures is used as a basis to make an individual layer of a device, e.g., an IC. The substrate may then undergo various device fabrication procedures of the device manufacturing process such as etching, ion-implantation (doping), metallization, oxidation, chemo-mechanical polishing, metrology (e.g., using a scanning electronic microscope (SEM)), etc., all intended to finish off the individual layer of the device. If several layers are required in the device, then the whole process, or a variant thereof, is repeated for each layer. Eventually, a device will be present in each target portion on the substrate. If there is a plurality of devices, these devices are then separated from one another by a technique such as dicing or sawing, whence the individual devices can be mounted on a carrier, connected to pins, etc.

So, manufacturing devices, such as semiconductor devices, typically involves processing a substrate (e.g., a semiconductor wafer) using a number of fabrication processes to form various features and multiple layers of the devices. Such layers and features are typically manufactured and processed using, e.g., deposition, lithography, etch, chemical-mechanical polishing, and ion implantation. Multiple devices may be fabricated on a plurality of dies on a substrate and then separated into individual devices. This device manufacturing process may be considered a patterning process. A patterning process involves a patterning step, such as optical or nanoimprint lithography using a lithographic apparatus, to provide a pattern on a substrate and typically, but optionally, involves one or more related pattern processing steps, such as resist development by a development apparatus, baking of the substrate using a bake tool, etching using the pattern using an etch apparatus, etc. Further, one or more metrology processes are typically involved in the patterning process.

As semiconductor manufacturing processes continue to advance, the dimensions of functional elements have continually been reduced while the amount of functional elements, such as transistors, per device has been steadily increasing over decades, following a trend commonly referred to as "Moore's law". At the current state of technology, layers of devices are manufactured using lithographic projection apparatuses that project a pattern corresponding to a design layout onto a substrate using illumination from a deep-ultraviolet illumination source, creating individual functional elements having dimensions well below 100 nm, i.e. less than half the wavelength of the radiation from the illumination source (e.g., a 193 nm illumination source). This process in which features with dimensions smaller than the classical resolution limit of a lithographic projection apparatus are printed, is commonly known as low-$k_1$ lithography, according to the resolution formula $CD=k_1 \times \lambda/NA$, where $\lambda$ is the wavelength of radiation employed (currently in most cases 248 nm or 193 nm), NA is the numerical aperture of projection optics in the lithographic projection apparatus, CD is the "critical dimension"—generally the smallest feature size printed—and $k_1$ is an empirical resolution factor. In general, the smaller $k_1$ the more difficult it becomes to reproduce a pattern on the substrate that resembles the shape and dimensions planned by a circuit designer in order to achieve particular electrical functionality and performance. To overcome these difficulties, sophisticated fine-tuning steps are applied to the lithographic projection apparatus and/or a pattern corresponding to a design layout. These include, for example, but not limited to, optimization of NA and/or optical coherence settings, customized illumination schemes, use of phase shifting patterning devices, optical proximity correction (OPC) in the pattern corresponding to the design layout (such as biasing of a pattern feature, addition of an assist feature, applying a serif to a pattern feature, etc.), or other methods generally defined as "resolution enhancement techniques" (RET).

BRIEF SUMMARY

To enable understanding of how a patterning process works, computational lithography techniques can be used to simulate how one or more aspects of the patterning process "work." Thus, appropriate computational lithography software can predict one or more characteristics of the formation of a pattern on a substrate, such as a predicted CD, predicted contour, etc. of the pattern, and possibly do so at different stages of the formation of the pattern.

One aspect of such computational lithography is the prediction of the pattern in the resist layer. But, it has been discovered that existing techniques to predict the formation of the pattern in the resist layer may not adequately and/or quickly assess a deformation of the pattern that can occur in the resist layer. Accordingly, it is desired, for example, to provide a technique that accurately and/or quickly estimates the expected (often highly complex) shapes of a resist pattern in view of a deformation action that can arise in the resist layer. So, there is provided, for example, a method and system to determine deformation of a resist layer using a fluid dynamics model.

In an embodiment, there is provided a method, comprising: obtaining a resist deformation model for simulating a deformation process of a pattern in resist, the resist deformation model being a fluid dynamics model configured to simulate an intrafluid force acting on the resist; performing, by a hardware computer system and using the resist deformation model, a computer simulation of the deformation process to obtain a deformation of the developed resist pattern for an input pattern to the resist deformation model; and producing electronic data representing the deformation of the developed resist pattern for the input pattern.

In an embodiment, there is provided a method, comprising: initializing a resist deformation model for simulating a deformation process of a portion of a pattern in resist, the resist deformation model being a fluid dynamics model configured to simulate an intrafluid force acting on the resist; and performing, by a hardware computer system, a computer simulation of the deformation process using the fluid dynamics model to obtain a deformation of a developed resist pattern corresponding to an input pattern, the simulation being performed for a plurality of iterations until a criteria is satisfied, wherein in each iteration at least one parameter associated with the fluid dynamics model is updated.

In an embodiment, there is provided a non-transitory computer program product comprising machine-readable instructions for causing a processor to cause performance of a method as described herein. In an embodiment, there is provided a system, comprising a hardware processor; and a non-transitory computer program product as described herein.

BRIEF DESCRIPTION OF THE DRAWINGS

The accompanying drawings, which are incorporated in and constitute a part of the specification, illustrate one or more embodiments and, together with the description, explain these embodiments. Embodiments of the invention will now be described, by way of example only, with reference to the accompanying schematic drawings in which corresponding reference symbols indicate corresponding parts, and in which:

FIG. 4A, FIG. 4B, FIG. 4C and FIG. 4D schematically show exemplary additional deformation caused by development of the resist layer.

DETAILED DESCRIPTION

Figure 1:
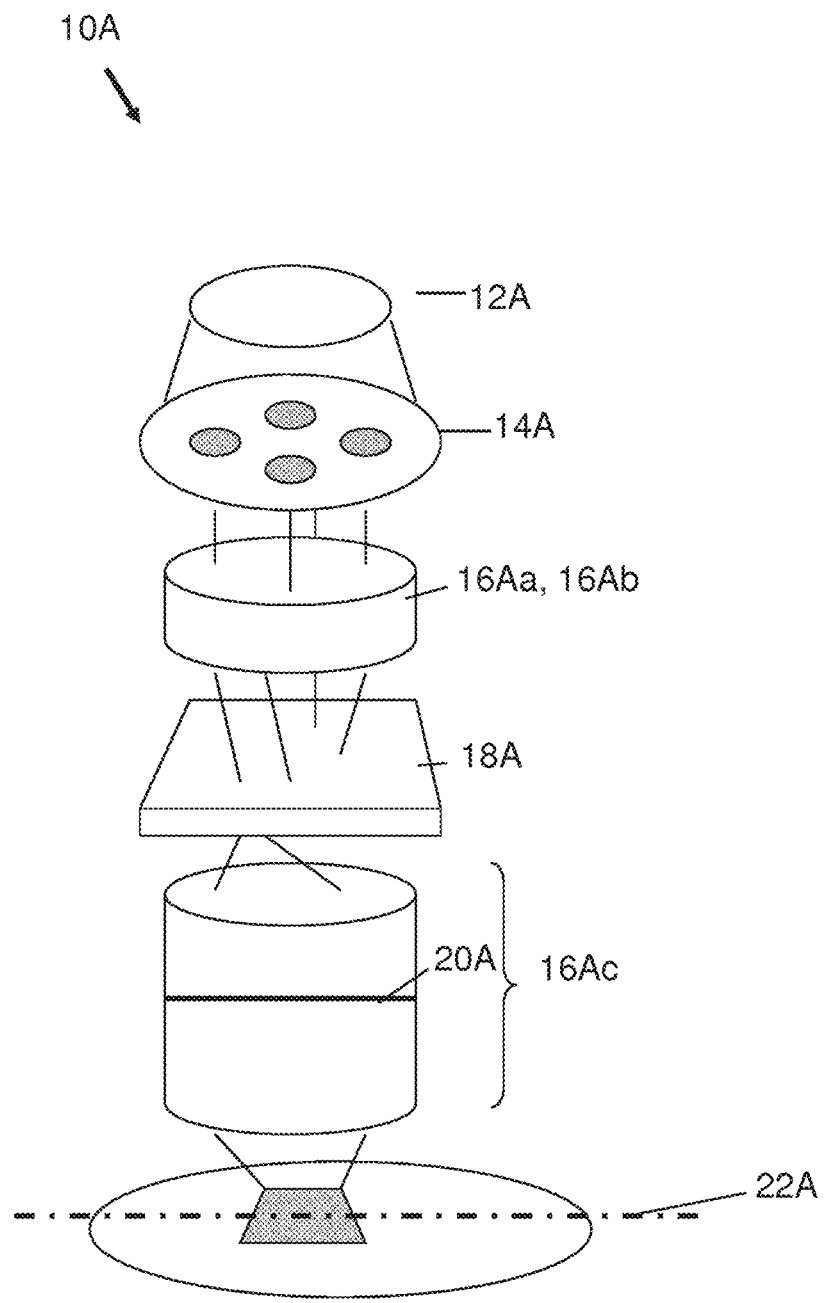
FIG. 1 is a block diagram of various subsystems of a lithography system.

As background to embodiments and turning to FIG. 1, there is illustrated an exemplary and highly schematic lithographic projection apparatus 10A. Major components are a radiation source 12A, which may be a deep-ultraviolet excimer laser source or other type of source including an extreme ultra violet (EUV) source, illumination optics which define the partial coherence (denoted as sigma) and which may include optics 14A, 16Aa and 16Ab that shape radiation from the source 12A; a support configured to hold a patterning device 18A; and projection optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics $NA=\sin(\Theta_{max})$. In an embodiment, the lithographic projection apparatus itself need not have the radiation source 12A.

So, in a lithographic projection apparatus, the optics 16Ac directs an aerial image of the patterning device pattern onto the substrate (typically a de-magnified version). An aerial image (AI) is the radiation intensity distribution at substrate level. A resist layer on the substrate is exposed and the aerial image is transferred to the resist layer as a latent "resist image" (RI) therein. The resist image (RI) can be defined as a spatial distribution of solubility of the resist in the resist layer.

Now, it is often desirable to be able computationally determine how a patterning process would produce a desired pattern on a substrate. Thus, a simulation can be provided to simulate one or more parts of the process. For example, it is desirable to be able to simulate the lithography process of transferring the patterning device pattern onto a resist layer of a substrate as well as the yielded pattern in that resist layer after development of the resist.

Figure 2:
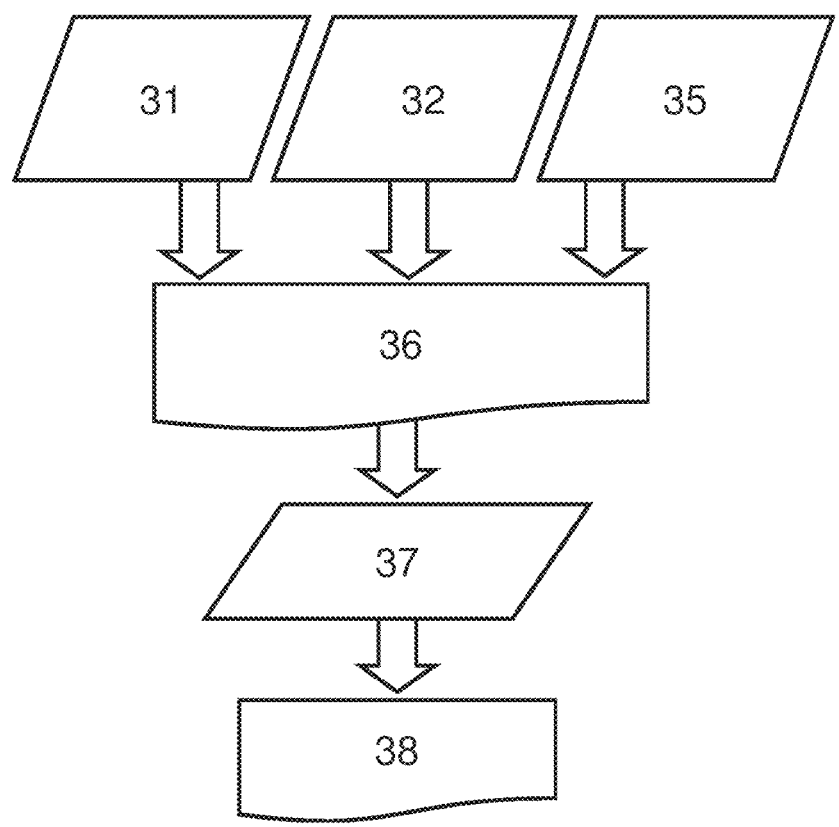
FIG. 2 is a block diagram of simulation models of a computational lithography technique.
Figure 3A:
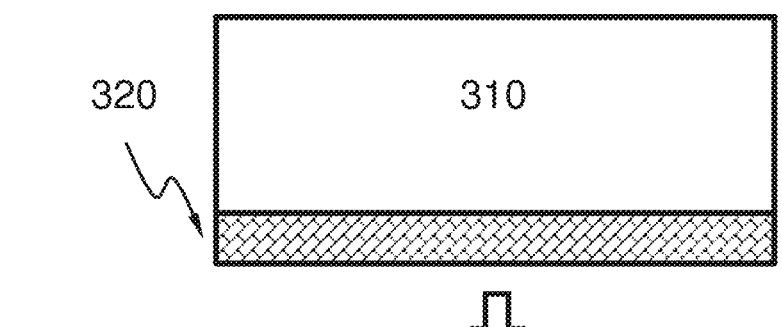
FIG. 3A, FIG. 3B, FIG. 3C and FIG. 3D schematically show exemplary deformation of a resist layer on a substrate.
Figure 3B:
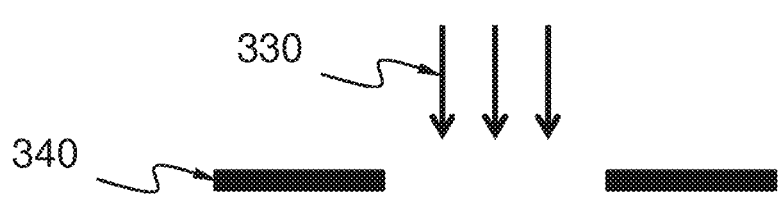
Figure 3C:
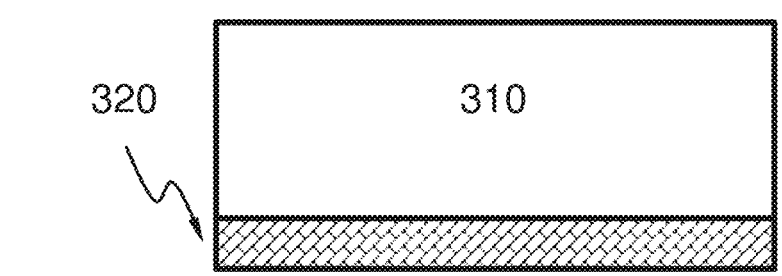
Figure 3D:
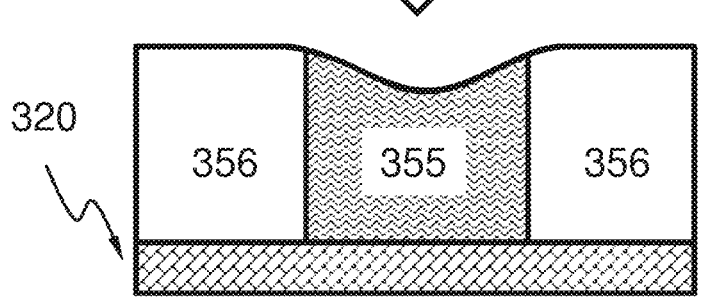

An exemplary flow chart for simulating lithography in a lithographic projection apparatus is illustrated in FIG. 2. An illumination model 31 represents optical characteristics (including radiation intensity distribution and/or phase distribution) of the illumination. A projection optics model 32 represents optical characteristics (including changes to the radiation intensity distribution and/or the phase distribution caused by the projection optics) of the projection optics. A design layout model 35 represents optical characteristics (including changes to the radiation intensity distribution and/or the phase distribution caused by a given design layout) of a design layout, which is the representation of an arrangement of features on or formed by a patterning device. An aerial image 36 can be simulated using the illumination model 31, the projection optics model 32 and the design layout model 35. A resist image 38 can be simulated from the aerial image 36 using a resist model 37. Simulation of lithography can, for example, predict contours and/or CDs in the resist image.

More specifically, it is noted that the illumination model 31 can represent the optical characteristics of the illumination, which characteristics include, but are not limited to, NA and/or sigma ($\sigma$) settings as well as any particular illumination shape (e.g. off-axis illumination such as annular, quadrupole, dipole, etc.). The projection optics model 32 can represent the optical characteristics of the projection optics, which characteristics include, for example, aberration, distortion, a refractive index, a physical size or dimension, etc. The design layout model 35 can also represent one or more physical properties of a physical patterning device, as described, for example, in U.S. Pat. No. 7,587,704, which is incorporated herein by reference in its entirety. Optical properties associated with the lithographic projection apparatus (e.g., properties of the illumination, the patterning device and the projection optics) dictate the aerial image. Since the patterning device used in the lithographic projection apparatus can be changed, it is desirable to separate the optical properties of the patterning device from the optical properties of the rest of the lithographic projection apparatus including at least the illumination and the projection optics, and hence design layout model 35 is provided.

The resist model 37 can be used to calculate the resist image from the aerial image, an example of which can be found in U.S. Pat. No. 8,200,468, which is incorporated herein by reference in its entirety. The resist model is typically related only to properties of the resist layer (e.g., effects of chemical processes which occur during exposure, post-exposure bake and/or development).

An objective of the simulation is to accurately predict, for example, edge placements, aerial image intensity slopes and/or CDs, which can then be compared against an intended design. The intended design is generally defined as a pre-OPC design layout which can be provided in a standardized digital file format such as GDSII, OASIS or other file format.

From the design layout, one or more portions may be identified, which are referred to as "clips". In an embodiment, a set of clips is extracted, which represents the complicated patterns in the design layout (typically about 50 to 1000 clips, although any number of clips may be used). As will be appreciated by those skilled in the art, these patterns or clips represent small portions (e.g., circuits, cells, etc.) of the design and especially the clips represent small portions for which particular attention and/or verification is needed. In other words, clips may be the portions of the design layout or may be similar or have a similar behavior of portions of the design layout where critical features are identified either by experience (including clips provided by a customer), by trial and error, or by running a full-chip simulation. Clips often contain one or more test patterns or gauge patterns. An initial larger set of clips may be provided a priori by a customer based on known critical feature areas in a design layout which require particular image optimization. Alternatively, in another embodiment, the initial larger set of clips may be extracted from the entire design layout by using some kind of automated (such as, machine vision) or manual algorithm that identifies the critical feature areas.

In some examples, the simulation and modeling can be used to configure one or more features of the patterning device pattern (e.g., performing optical proximity correction), one or more features of the illumination (e.g., changing one or more characteristics of a spatial/angular intensity distribution of the illumination, such as change a shape), and/or one or more features of the projection optics (e.g., numerical aperture, etc.). Such configuration can be generally referred to as, respectively, mask optimization, source optimization and projection optimization. Such optimizations can be performed on their own or combined in different combinations. One such example is source-mask optimization (SMO) involves the configuring of one or more features of the patterning device pattern together with one or more features of the illumination. The optimization techniques may focus on one or more of the clips. The optimizations may use the simulations described herein to produce values of various parameters.

In an optimization process of a system, a figure of merit of the system can be represented as an objective function, such as a cost function. The optimization process boils down to a process of finding a set of parameters (design variables) of the system that, e.g., minimizes or maximizes the objective function (e.g., minimize a cost function). The objective function can have any suitable form depending on the goal of the optimization. For example, the objective function can be weighted root mean square (RMS) of deviations of certain characteristics (evaluation points) of the system with respect to the intended values (e.g., ideal values) of these characteristics; the objective function can also be the maximum of these deviations (i.e., worst deviation). The term "evaluation points" herein should be interpreted broadly to include any characteristics of the system. The design variables of the system can be confined to finite ranges and/or be interdependent due to practicalities of implementations of the system. In case of a lithographic projection apparatus, the constraints are often associated with physical properties and characteristics of the hardware such as tunable ranges, and/or patterning device manufacturability design rules and the evaluation points can include physical points on a resist image on a substrate, as well as non-physical characteristics such as dose and focus.

As noted above, a layer on a substrate can have a pattern transferred thereto. Such a layer will be generally referred to as a resist layer and may have various chemical compositions. In an embodiment, the resist layer is a layer of radiation-sensitive material. The resist layer usually has a small but finite thickness that may be comparable in size to patterns imaged onto the resist. The resist layer may undergo various treatments in a lithographic process. For example, the resist may be exposed to radiation such as EUV or DUV, which induces chemical reactions in the resist. The resist may undergo a post-exposure bake (PEB), development (e.g., positive tone development or negative tone development), and/or a hard bake. Each of these treatments may cause the resist to deform in one, two or three dimensions and the deformation may be location dependent (e.g., three-dimensional location dependent). The deformation of the resist may affect downstream treatments such as material deposition and etching. In a lithographic process using negative tone development, the impact of the resist deformation on resist top loss and critical dimension may be especially significant. Therefore, a resist model 37 with the ability to predict deformation of the resist is beneficial to more accurate lithography and higher yield. The resist model 37 may also be able to predict the reaction of the resist layer to various other physical and chemical treatments in the lithographic process. An exemplary resist model according to an aspect of the present disclosure is described later.

FIG. 3A, FIG. 3B, FIG. 3C and FIG. 3D schematically show exemplary deformation of a resist layer 310 on a substrate 320. A pattern is formed in the resist layer, e.g., by exposing the resist layer 310 to radiation 330 via a patterning device 340. The resist layer 310 may undergo post-exposure treatments such as PEB and deform into a deformed resist layer 350. In this example, the deformation of the resist layer 310 is such that the portion of the deformed resist layer 350 exposed to the radiation has a smaller thickness than the rest of the deformed resist layer 350. A portion 355 of the deformed resist layer 350 received sufficiently high dose during the exposure so as to remain on the substrate 320 after negative tone development and the rest (e.g., portions 356) of the deformed resist layer 350 is dissolved after negative tone development. Alternatively, the portion 355 of the deformed resist layer 350 received sufficiently high dose during the exposure so as to dissolve during positive tone development and the rest of the deformed resist layer 350 remains on the substrate 320 after positive tone development. Whether the portion 355 remains or dissolves depends on the chemical composition of the resist and the chemical composition of the developer.

Figure 4C:
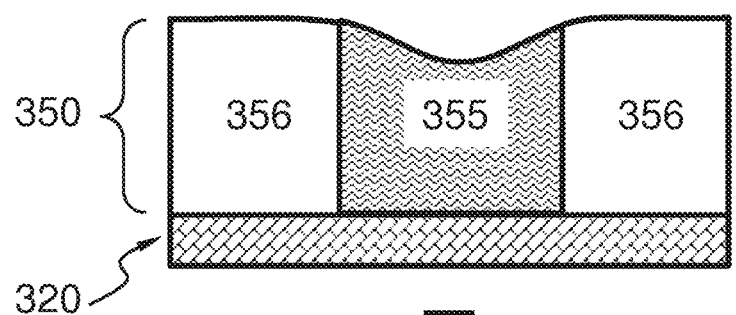
Figure 4D:
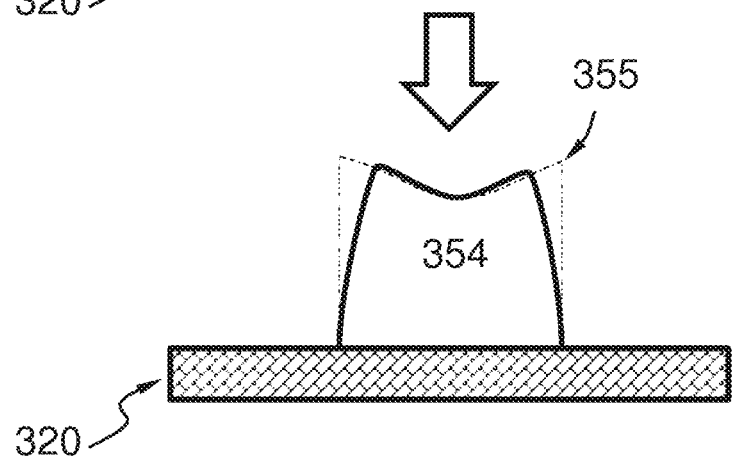

Portions of the resist layer soluble to a developer are removed during development; these are referred to as developed regions, portions or areas. The removal of these portions may cause deformation in the remaining portions of the resist layer that is in addition or alternatively to deformation in the resist layer 350 as described with respect to FIG. 3. FIG. 4A, FIG. 4B, FIG. 4C and FIG. 4D schematically show such exemplary additional deformation. FIG. 4A shows the exposed resist layer 350 of FIG. 3 (with the optional deformation shown in FIG. 3C) with the portion 355 that received sufficiently high dose during the exposure and thus is soluble to a positive tone developer and one or more portions 356 that did not receive sufficiently high dose and thus are insoluble to the positive tone developer. FIG. 4B shows that, during development, the portion 355 is dissolved and the portion(s) 356 remain. As part of such development or during a period thereafter, portion(s) 356 can deform into portion(s) 357. This can occur during the removal of the portion 355 and/or for a period after development is completed. The dotted lines represent the contour of the portion(s) 356. In the example, the portion(s) 356 contract and become the portion(s) 357. FIG. 4C shows the exposed resist layer 350 of FIG. 3 (with the optional deformation shown in FIG. 3C) with the portion 355 that received sufficiently high dose during the exposure and thus is insoluble to a negative tone developer and portion(s) 356 that did not receive sufficiently high dose and thus is soluble to the negative tone developer. FIG. 4D shows that, during development, the portion 355 remains and the portion(s) 356 is dissolved. As part of such development or during a period thereafter, portion 355 can deform into portion 354. This can occur during the removal of the portion(s) 356 and/or for a period after development is completed. The dotted lines represent the contour of the portion 355. In the example, the portion 355 contracts and becomes the portion 354.

As noted above, simulation models attempt to accurately predict patterns in a resist profile. The resist is a viscoelastic material and, for a period of time, the resist exhibits a fluidic behavior that is significant. Intermolecular forces, pressure and/or other forces (generally referred to herein as intrafluid forces) can result in a stress in the fluid that yields a viscous flow. Simulation models fail to account for such a viscous flow within the resist. Moreover, the effects of intrafluid forces acting on the resist tend to be significant when the resist pattern is dense. So, simulation models are not able to predict, with high accuracy, shapes of a resist pattern (particularly dense patterns or patterns with high curvature) in resist, which can lead to downstream effects such as modeling errors.

Figure 5:
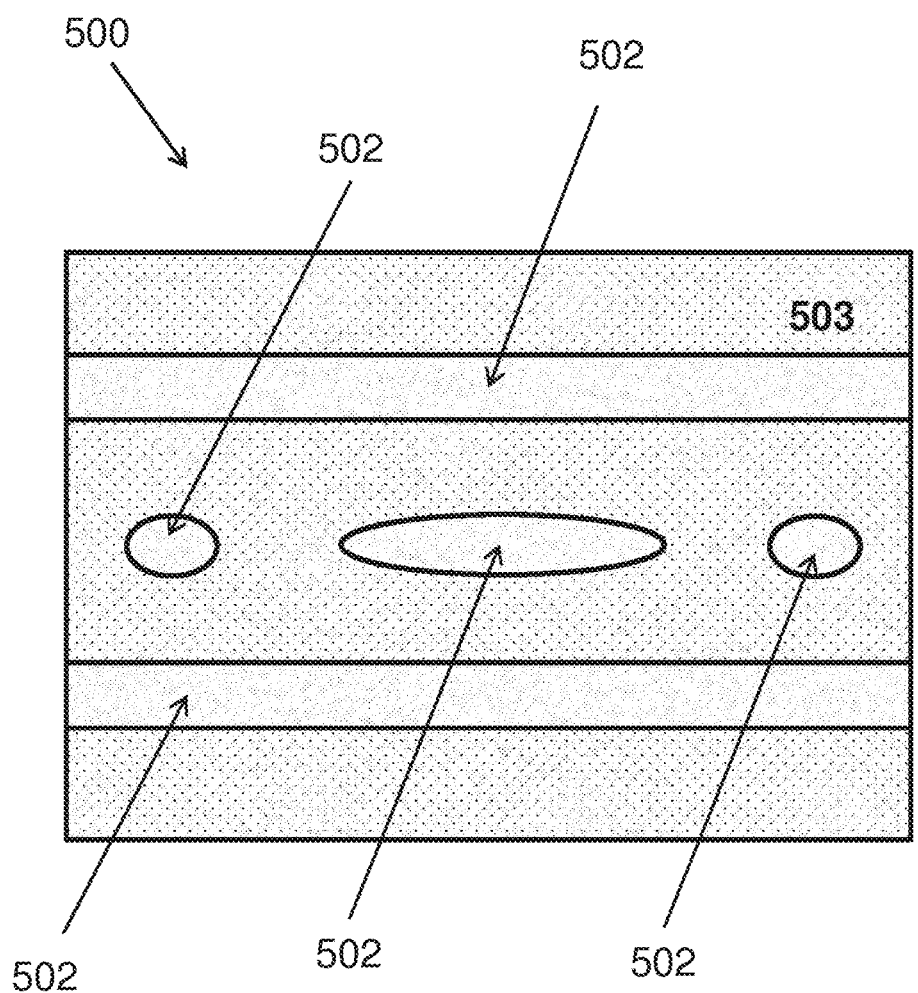
FIG. 5 depicts an exemplary image illustrating a resist pattern.

Turning now to FIG. 5, there is depicted according to an embodiment, an exemplary schematic portion of a resist pattern 500. In this case, the resist pattern 500 is represented as an image and can be a binary image that is obtained by a method as described later with reference to FIG. 6. The resist pattern 500 includes a plurality of developed portions 502 that are surrounded by resist 503. One or more intrafluid forces, (e.g., surface tension) typically act on the resist thereby deforming the resist at the boundaries of the developed portions of the resist. Thus, a shape of a resist pattern, corresponding to a developed portion, deforms at several locations along the boundary of the developed portion. In an embodiment, the driving force acting on the resist is surface tension.

So, it would be desirable to have a resist model that accounts for deformation arising from, e.g., the surface tension acting on the resist. So, it would be desirable to have a model that is able to predict, with high accuracy, the contours of pattern shapes in a resist. Accordingly, in an embodiment, there is provided a resist model that takes into account the effects of surface tension and/or other intrafluid forces on the resist and computes the corresponding deformation of the resist.

In an embodiment, the resist model comprises a fluid dynamics model based on Navier-Stokes flow equations that capture a viscous flow in the resist arising from one or more intrafluid forces and computes a corresponding deformation of the resist. So, the fluid dynamics model is able to accurately predict, e.g., complex shapes of the resist pattern.

In particular, the resist exhibits a fluidic window during a development process, wherein a driving force of deformation tends to be surface tension, and wherein the resist deformation is dependent on the viscosity of the resist material. Accordingly, in an embodiment, a time-dependent 2D fluid dynamics model is assumed for the resist and the deformation is computed via the Navier-Stokes equations. Specifically, the binary image 500 depicted in FIG. 5 is used as an input to the fluid dynamics model, and the resist is simulated as a liquid for a specific time window.

Figure 6:
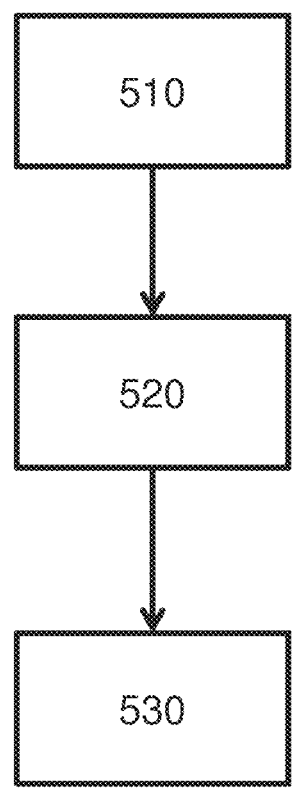
FIG. 6 depicts a flow diagram illustrating a method of obtaining the image of the resist pattern of FIG. 5.

FIG. 6 depicts a flow diagram illustrating a method of obtaining a binary image of the resist pattern. In step 510, a patterning device pattern is obtained. In step 520, an aerial image is produced based on the obtained patterning device pattern. In an embodiment, commercial software products such as ASML's Tachyon software, Panoramic Technology's HyperLith software, KLA-Tencor's ProLith software, or the like can be used to produce the aerial image. In a typical situation, the aerial image is a grayscale image, wherein each pixel of the image corresponds to a different radiation intensity (i.e., before the radiation impinges on the resist).

In step 530, a binary image of the resist pattern can then be obtained by extracting contours of the aerial image based on a threshold level and, for the sake of simplicity, treating the portion in the image enclosed by the contours (i.e., the subsequently developed portion) as empty space (and then represented by one binary value) and the portion of the image outside the contours (i.e., the portions not subsequently developed) as resist (and then represented by the other binary value). Of course, the arrangement can be that the portion outside the contours is empty and the portion inside the contours is resist.

In an embodiment, a resist model that predicts the latent resist image, i.e., the pattern of soluble resist and insoluble resist in the layer after exposure and typically after a post-exposure bake, can be used to form the resist pattern 500 image. Where the latent resist image is grayscale form, it can be binarized.

In an embodiment, and as described below with reference to FIG. 7, a resist pattern image is used as an input image to a fluid dynamics model of the present disclosure to predict the deformation of the resist in order to set up the fluid dynamics model to predict deformation of the resist.

Figure 7:
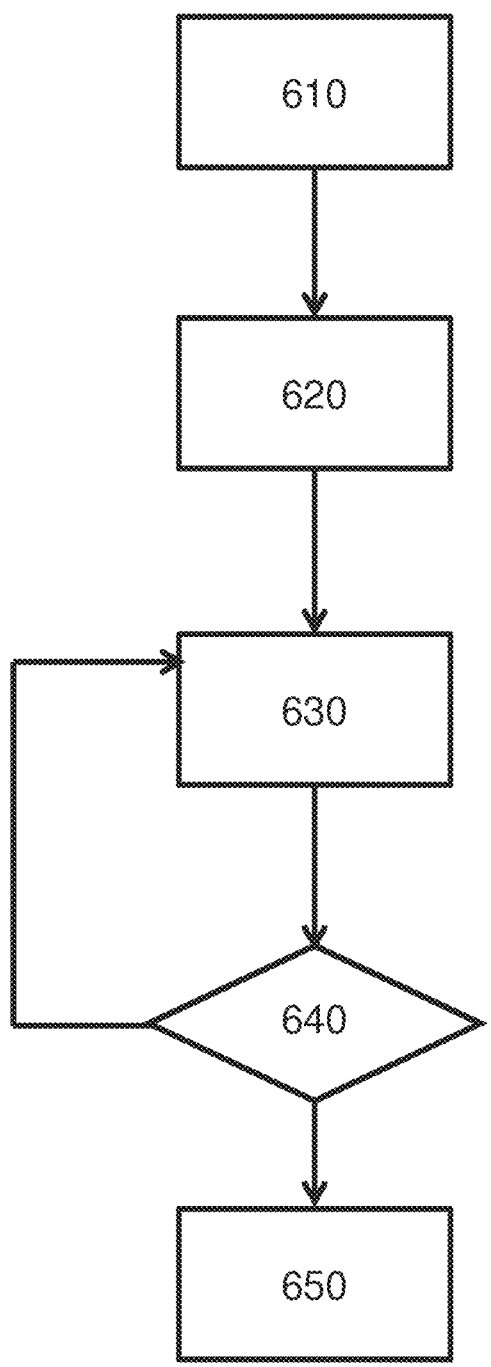
FIG. 7 depicts an exemplary flowchart illustrating the steps performed in simulating a resist pattern based on a fluid dynamics model, in order to determine deformation of the resist pattern.

FIG. 7 depicts an exemplary flowchart illustrating steps performed in simulating a resist pattern based on a fluid dynamics model, in order to determine deformation of the resist pattern, and set up the fluid dynamics model to predict deformation of the resist. In general terms, the fluid dynamics model is set up by simulating resist deformation with a set of initial conditions for a resist pattern image for which there is measured data (e.g., measured CD values) of one or more such resist patterns formed in an actual resist. The prediction is matched with the measured data in order to fit values of the parameters of the fluid dynamics model. In this way, parameters such as density, viscosity, etc. of the resist do not need to be measured, but rather effectively get determined through the fitting. The resulting fitted fluid dynamics model to predict resist deformation can then take as input any other resist pattern image and predict a resist deformation for that resist pattern.

Figure 8A:
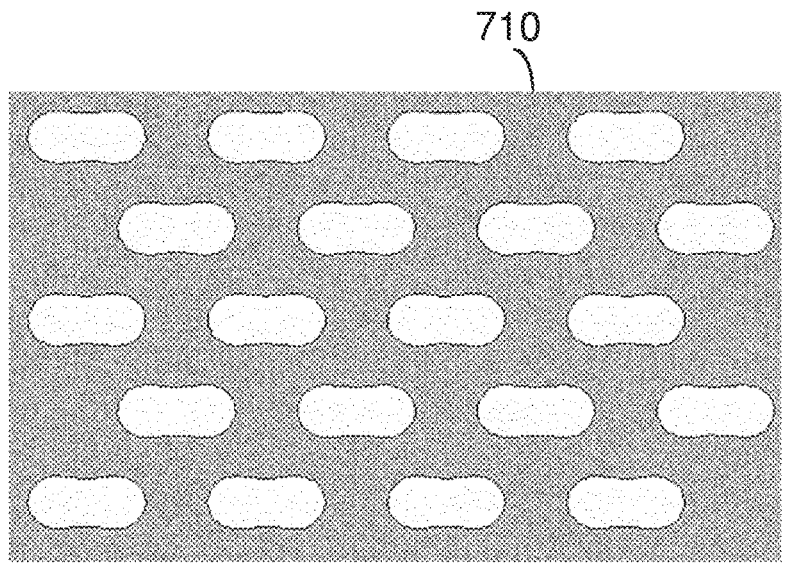
FIG. 8A depicts an exemplary input resist pattern of the fluid dynamics model.

So, at step 610, a resist pattern is obtained. In an embodiment, a binary image 710 as depicted in FIG. 8A is obtained by, e.g., the process as described above with reference to FIG. 6. The resist pattern image is an input to the fluid dynamics model.

Figure 8B:
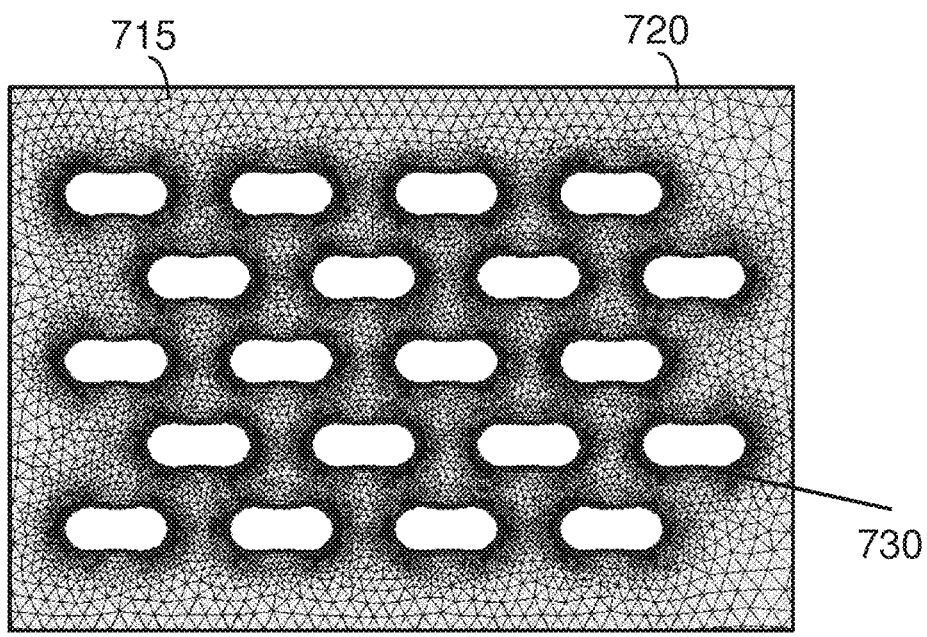
FIG. 8B depicts an exemplary resist pattern configured for use by the fluid dynamics model.

In step 620, the fluid dynamics model based on Navier-Stokes equations is defined with respect to the pixels of the resist pattern image of step 610. In an embodiment, the resist pattern image is converted into a mesh 715 for finite element analysis using the Navier-Stokes equations such as depicted in FIG. 8B. In an embodiment, inputs to the fluid dynamics model include one or more selected from: a parameter for the density of the resist parameter, a parameter for the viscosity of the resist, a parameter for the surface tension acting on the resist, and/or a time parameter. The fluid dynamics model is utilized to simulate the resist as a liquid and compute a velocity vector of the resist at each pixel/mesh position in the image. Note that a magnitude and optionally a direction of resist deformation can be obtained by multiplying a time parameter with the computed velocity vector of the resist. Thus, in an embodiment, depending on the calculated resist deformation at a particular spatial location, certain pixels can be changed from one binary state to another binary state in order to produce a deformed resist pattern image. In an embodiment, one or more of the pixels can be deformed depending on the calculated deformation in a mesh type arrangement to yield a deformed resist pattern image.

In an embodiment, the fluid dynamics model is defined as a set of partial differential equations. For example, the fluid dynamics model can be defined using the following:
A mass continuity equation:

$$\frac{\partial \rho}{\partial t} + \nabla \cdot (\rho u) = 0, \qquad (1)$$

and a Navier-Stokes momentum equation:

$$\rho \frac{\partial u}{\partial t} + \rho(u \cdot \nabla)u = \nabla \cdot \left[ -\rho I + \mu(\nabla u + (\nabla u)^T) - \frac{2}{3}\mu(\nabla \cdot u)I \right] + F, \qquad (2)$$

where ρ corresponds to the density of the resist, μ corresponds to the viscosity of the resist, u corresponds to the velocity vector, ∇ is the divergence, t corresponds to time, T identifies the transpose matrix and F corresponds to another body force.

Further, in step 620, boundary conditions are set for the resist pattern. For instance, a boundary 720 for the resist pattern is set as depicted in FIG. 8B, and velocities vertical to the boundary (wall) 720 are permitted in the fluid dynamics model. In an embodiment, boundary conditions at the resist shapes' boundary 730 (as shown in FIG. 8B) are set such that the applied resist pressure at the boundary 730 is set to about zero. The resist boundary conditions can be expressed as, for example:

$$n_i \tau = -p_{ext} n_i + f_{st} \qquad (3)$$

wherein $n_i$ corresponds to the normal vector, $p_{ext}$ corresponds to the external pressure and wherein:

$$f_{st} = \sigma(\nabla_s \cdot n_i) n_i - \nabla_s \sigma \qquad (4)$$

$$\tau = 2\mu S - \frac{2}{3}\mu(\nabla \cdot u)I \qquad (5)$$

wherein S represents the strain-rate tensor $$\left( S = \frac{1}{2}(\nabla u + (\nabla u)^T) \right),$$

I corresponds to the identity matrix, $\nabla_s$ represents the surface gradient operator, and σ corresponds to the surface tension acting on the resist.

At step 630, a simulation of the fluid dynamics model to obtain a deformation of the resist pattern is performed using values for the various parameters. At an initial run of the simulation, an appropriate initial set of values of the various parameters can be used; in a typical example, it won't be known what the exact viscosity, density, etc. is across the resist pattern for a typical process.

As described above, at step 630, the value of one or more parameters of the fluid dynamics model can be varied for the purposes of fitting as described in more detail below and the simulation run with the varied value(s). In an embodiment, at least one input parameter from the set of input parameters including a parameter of, or associated with, density, a parameter of, or associated with, a parameter of, or associated with, viscosity, a parameter of, or associated with, surface tension, and/or a parameter of, or associated with, time can be varied to obtain the deformation of the resist pattern simulated using the varied value(s). In an embodiment, each of a parameter of, or associated with, density, a parameter of, or associated with, viscosity, a parameter of, or associated with, surface tension, and a parameter of, or associated with, time are capable of being varied—a 4 parameter fit. In an embodiment, density, viscosity, and surface tension are capable of being varied. In an embodiment, a parameter of, or associated with, time, a parameter of, or associated with, viscosity and a parameter of, or associated with, surface tension are capable of being varied.

In an embodiment, an Ohnesorge number (OhN) of the resist relates the density of the resist, viscosity of the resist, and surface tension acting on the resist as follows:

$$OhN \propto \frac{u}{\sqrt{\sigma \cdot \rho}},$$

wherein the symbol $\propto$ indicates proportional to. Accordingly, the fluid dynamics model can be characterized in terms of the Ohnesorge number and so the Ohnesorge number and optionally the time parameter can be varied, at step 630, to obtain a deformation of the resist using the varied value(s).

In an embodiment, a capillary number (CN) of the resist relates the viscosity of the resist and surface tension acting on the resist as follows:

$$CN \propto \frac{u}{\sigma},$$

wherein the symbol $\propto$ indicates proportional to. Accordingly, the fluid dynamics model can be characterized in terms of the capillary number and so the capillary number and optionally the time parameter can be varied, at step 630, to obtain a deformation of the resist using the varied value(s).

Perhaps in some cases, a certain value of a parameter might be known in which case it can be held as fixed (or constrained to vary slightly) while other parameters are varied. For example, the time might be known where it is known that the measured values used for the fitting were obtained after a certain known time.

In an embodiment, the viscosity is assumed to be constant and so the model may be characterized as a Newtonian fluid dynamics model. But, in an embodiment, the viscosity may not be assumed constant, so the fluid is non-Newtonian. Accordingly, in an embodiment, the viscosity in the model can vary. For example, it can be modelled using the following expression:

$$\mu = \mu_\infty + (\mu_0 - \mu_\infty)\left[1 + (\lambda \dot{\gamma})^2\right]^{\frac{(n-1)}{2}} \quad (6)$$

wherein $\mu_0$ is the viscosity at zero shear rate, $\mu_\infty$ is the viscosity at infinite shear rate, $\lambda$ is the relaxation time, $\dot{\gamma}$ is the shear rate, and n is the power index.

Figure 9A:
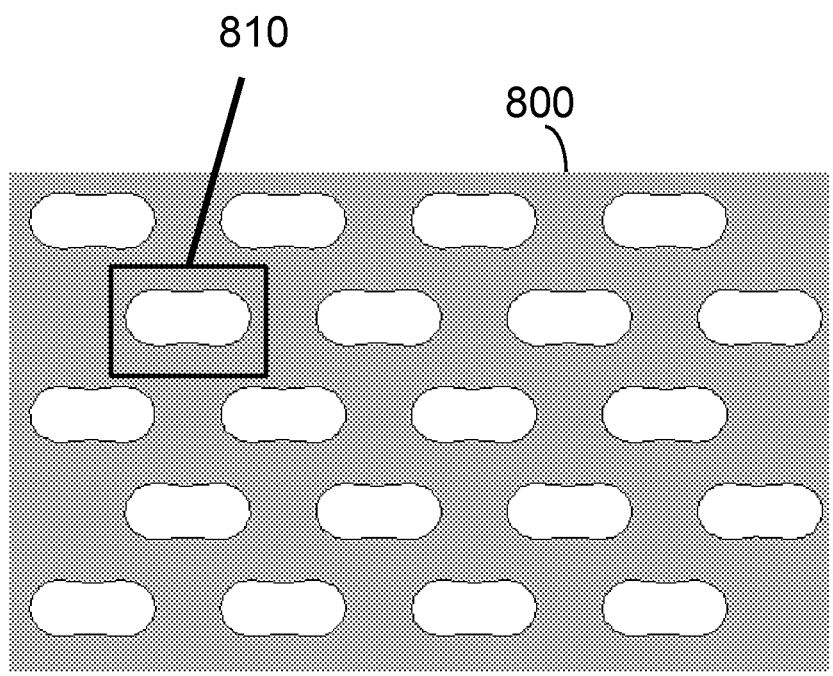
FIG. 9A depicts an exemplary simulation output of the fluid dynamics model.
Figure 9B:
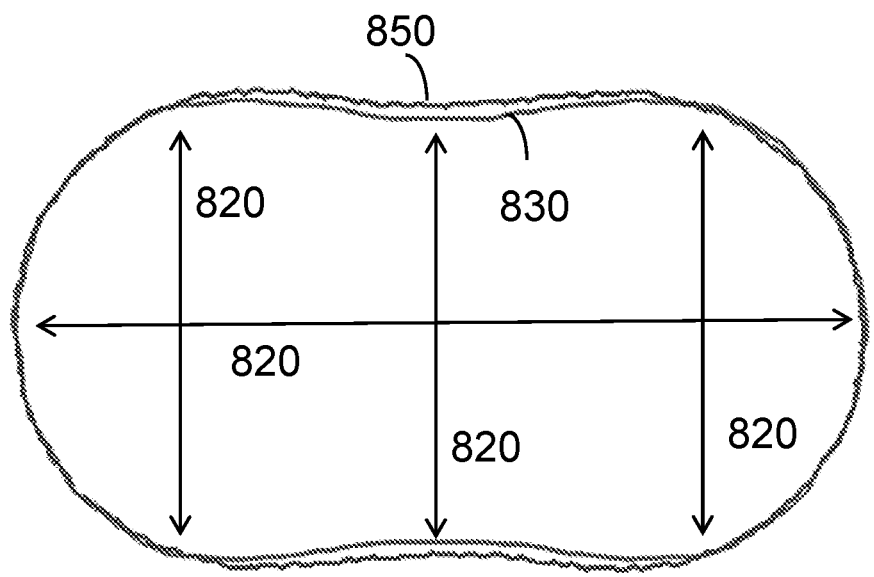
FIG. 9B depicts an exemplary simulation output of the fluid dynamics model compared with the input resist pattern.

FIG. 9A depicts an exemplary schematic output obtained by varying at least one input parameter of the fluid dynamics model. Specifically, FIG. 9A depicts an exemplary deformed resist pattern image 800 including a developed portion shape 810 in which the deformation of the developed portion shape has been determined. FIG. 9B shows a close up of the contour of the shape 810 compared with a comparable contour of the shape from the input resist pattern image. The simulated deformed contour 850 (corresponding to shape 810) as computed by the fluid dynamics model is depicted. Further, for comparison, the contour 830 of the corresponding shape from the input resist pattern 830 is depicted. As can be seen, there is relatively slight, but significant, deformation at the central portion of the shape.

At step 640, an output of a simulation using the fluid dynamics model (e.g., computed critical dimensions 820 along the contour 830) is compared with measured data (e.g., measured data (e.g., measured CD values) of one or more resist patterns that are formed in an actual resist and that correspond to the simulated resist pattern such as measured critical dimensions 820 at similar locations on the actual resist patterns corresponding to contour 830) to determine an error between the computed data and the measured data. For example, in essence, a comparison is performed between points along a simulated contour 850 and an actual contour of a resist pattern formed in resist in order to determine whether the simulation matches the actual.

For example, the measured data can comprise CD values at different locations along the contour of the developed portions of the resist pattern that match to similar locations on the boundary of the developed portions of the resist pattern image of the fluid dynamics model. FIG. 9B shows, as arrows, some example critical dimensions 820 for which measured data can be obtained from one or more actual resist patterns corresponding to that shape and the associated locations relative to the contours 830/850.

At 640, a query is performed to determine whether the simulated data from the fluid dynamics model matches the actual data sufficiently according to a criteria (e.g., a permitted margin of difference). If the response to the query is affirmative, the process proceeds to step 650, else the process loops back to step 630 and executes another iteration of the simulation process by modifying at least one parameter of the input set of parameters for a further comparison in step 640. In an embodiment, steps 630 and 640 are repeated until a sufficient match between the simulated data and the measured data is obtained. For example, the steps 630 and 640 can be repeated until a computed difference between measured and simulated data meets or crosses a threshold, is minimized, or does not vary by more than a certain amount after a certain number of iterations, can be repeated for a certain number of iterations, etc. So, in an embodiment, a fitting of the fluid dynamics model parameters can be obtained by comparing error values between the predicted and measured data and minimizing towards the set of parameters that gives a lower or lowest error.

Upon a sufficient match being obtained for a sufficient number of shapes of the resist pattern image, the fluid dynamics model is sufficiently defined for the particular characteristics of the patterning process used to create the measured data (e.g., the type of resist used and other pertinent process parameters). With the sufficiently defined fluid dynamics model, a simulation using an input resist pattern image can accurately predict the deformation of at least part of the input resist pattern as formed on actual resist. For example referring to FIG. 4B, the dimension (e.g., length or width) between the resist portions 357 is denoted by a distance 370 as, for example, predicted using a model that doesn't incorporate the fluid dynamics techniques as described herein. However, upon utilizing the fluid dynamics model described herein, a more accurate distance 380 between the deformed resist portions 357 can be estimated.

If a patterning process with different characteristics is used (e.g., it is desired to determine the deformation of a pattern layout for a different patterning process or for a modification of the patterning process), a new fluid dynamics model can be setup using the calibration sequence described above. In an embodiment, an already calibrated fluid dynamics model can form the start of the calibration of the new fluid dynamics model for the different or modified patterning process.

At step 650, the model can then be used with another desired input resist pattern image to determine corresponding resist deformation data. So, once the model is setup, a user can, for the process for which the model has been setup, input a pattern layout of choice and create deformation information (e.g., a deformed image) of that pattern layout. The deformation information (e.g., a contour, CD values, etc.) can be used for various purposes, such as design of a device manufacturing process, correction of a device manufacturing process, control of the device manufacturing process, etc.

In the description of the modeling process described above with reference to FIG. 7, the thickness/height of the resist material was assumed to be zero. Specifically, a 2D fluid model was assumed for the resist and the deformation of the resist pattern was computed based on Navier-Stokes equations for such a regime. According to an embodiment, in order to capture 3D resist deformations (e.g., side-wall angles), the above fluid dynamics model can be modified to account for a time-dependent density (p) change in the form of, e.g.: $p=p_{init}+a*t$ wherein $p_{init}$ is the initial density, t is the time and a is a fitting coefficient. Further, the model can evaluate the deformation at "slices" through the resist thickness to obtain the deformation in the 2D plane at different thicknesses. Like the techniques described above, the density parameter can be fitted using similar techniques as described above in relation to FIG. 7; for example, in an embodiment, time, viscosity, surface tension and the density parameter are capable of being varied. Accordingly, the 3D version of the fluid dynamics model of the present disclosure can be used to estimate, in an accurate manner, correct 3D dimensions of the resist pattern. For example referring to FIG. 4B, the dimension (e.g., length) between the resist portions 357 denoted by distance 380 can be estimated as well as the distances 390 at varying thicknesses through the resist.

Figure 10:
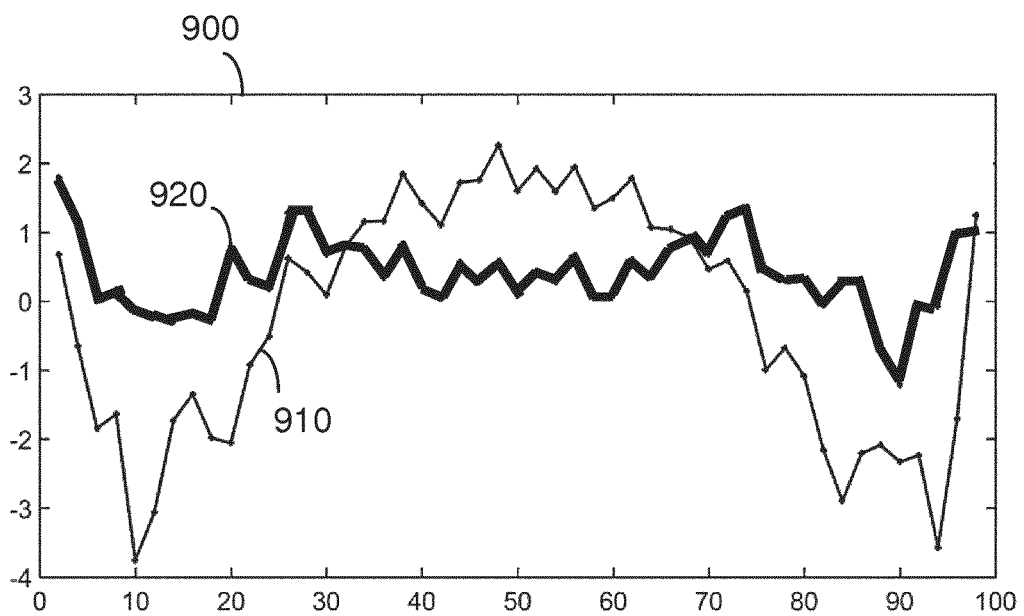
FIG. 10 depicts an exemplary graph illustrating performance of the fluid dynamics model of the present disclosure.

Turning now to FIG. 10, there is depicted an exemplary graph 900 illustrating performance of the fluid dynamics model of the present disclosure. The graph 900 includes error (computed in nanometers (nm)) plotted on the Y-axis, against a set of metrology points along a sample resist pattern plotted on the X-axis. Curve 910 depicts errors in critical dimension between measured data and predicted data obtained using a model/simulation that doesn't account for deformation using a fluid dynamics model, and curve 920 depicts errors in critical dimension between measured data and predicted data after accounting for deformation using a fluid dynamics model. It can be observed that when the fluid dynamics model accounts for the effects of, e.g., surface tension, the error between the simulated and measured critical dimensions are significantly reduced. Thus, the fluid dynamics model of the present disclosure can accurately estimate the actual shapes of a resist pattern.

While embodiments have been described in terms of binary images as the resist pattern image, in an embodiment, the input resist pattern image can be grayscale and/or the output deformed resist pattern image can be grayscale. Further, while embodiments have been described in terms of usage of images, it will be appreciated that the resist pattern can be more generally characterized in terms of data, such as CDs, coordinate locations, vectors, etc. and so the input resist pattern data and/or the output deformed resist pattern resist deformation data can be in a non-image form such as CD values, coordinate locations, vectors, etc.

In an embodiment, it is possible the resist may have one or more open regions that are not developed regions, e.g., one or more regions that are not dissolved by developer. Examples may include an etched away portion of a resist. Like in developed regions, surface tension or deforming effects may be found in these one or more open regions. For example, developer can go into these open regions even though there is no material in those regions to be dissolved by the developer. Accordingly, in an embodiment, the techniques herein can be applied to such open regions in an addition to or alternatively to the developed regions.

In an embodiment, it was assumed that developed areas are effectively empty (e.g., containing gas or vacuum). In a variation, the developed areas can be treated as including a material other than vacuum or merely gas, such as a liquid, gel, etc. It can have its own viscosity, density, etc. values and be fitted like discussed before.

In an embodiment, the fluid dynamics model can be relatively fast by adopting the binarization of the resist pattern image data. Additionally or alternatively, simplification of the Navier-Stokes equations for faster application towards full-chip solutions can be done by discretizing the equations and representing them by a sum of kernel functions.

Further, the effect of surface tension can give a long range velocity field, which can prove noticeably larger than zero at relatively large distances from boundaries between the essentially insoluble resist and the developed or open region (where, at these resist boundaries, the surface tension force is applied). As a result, the modelled image (e.g., a grayscale resist image) shows deformation through much, if not all, of the image. For example, the determination of a deformation for a boundary of a particular first developed or open region may result in a deformation of a boundary of a second developed or open region at quite a distance from the first developed or open region, which deformation may not be observed in practice. This can give challenges to using the resulting modelled image as part of a larger modelling flow used, such as SMO and/or OPC.

So, it has been found that there is a variation in viscosity of the resist near the developed resist area. For example, it has been found that there is a variation in mean viscosity of the resist along the resist height near the developed resist area. While the developer dissolves the soluble portion of the resist, the developer also effectively penetrates into the essentially insoluble portion of the resist during development, yielding a region of different viscosity at the boundary between a developed or open region and the essentially insoluble resist. It is this region of different viscosity that predominantly yields the deformation of the resist. So, in an embodiment, the essentially insoluble portion of the resist is modeled with parameters of, or associated with, two or more viscosity values. While an embodiment is described herein with two viscosity values for the essentially insoluble portion, more than two viscosity values may be modeled.

In particular, in an embodiment, the surface tension model assumes a gel-type layer at the boundary between a developed or open region of the resist and the essentially insoluble resist. In that case, the simulated domain becomes a liquid1/liquid2/fluid model, where "liquid1" corresponds to the essentially insoluble resist, "fluid" corresponds to the gas or vacuum in the developed or open region, and "liquid2" corresponds to a gel-type layer at the boundary between the developed or open region ("fluid") and the essentially insoluble resist region ("liquid1"). So, the "liquid1" and "liquid2" in this liquid1/liquid2/fluid model have respectively their own parameter of, or associated with, viscosity such they represent two or more viscosity values. For example, "liquid1" can have a parameter of, or associated with, a first viscosity ($\mu 1$) and "liquid2" can have a parameter of, or associated with, a second viscosity ($\mu 2$), wherein $\mu 1$ and $\mu 2$ have different values. However, when $\mu 1=\mu 2$, the gel-type layer model becomes the same as the model described earlier wherein the viscosity is treated as uniform throughout the essentially insoluble resist portion (and thus a long range interaction force is assumed).

In an embodiment, the viscosity of the "fluid" is set to a low value, compared to "liquid1" and "liquid2", and does not change during the calibration process. Similarly, the density of the "fluid" can be set to a low value, compared to "liquid1" and "liquid2", and not change during the calibration process. In an embodiment, the fluid can represent a vacuum (and not change during the calibration process). In an embodiment, the fluid can represent a liquid, such as described above. In an embodiment, when the fluid is a liquid, the viscosity and/or density thereof may not change during the calibration process. In an embodiment, the viscosity and/or density of the "fluid" is different than "liquid1" and/or "liquid2."

Figure 11:
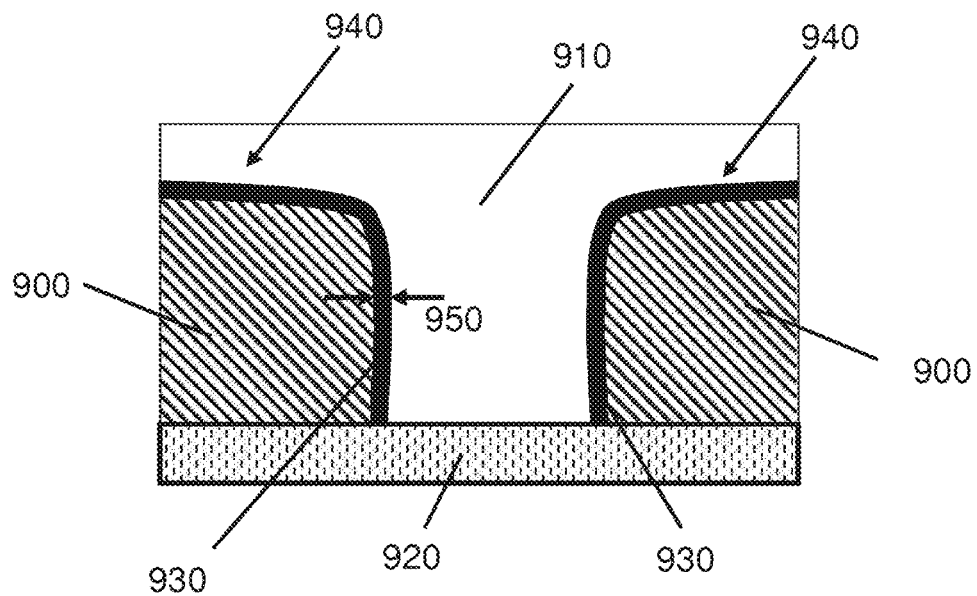
FIG. 11 depicts a schematic cross-section of a resist model of the present disclosure.

Referring to FIG. 11, a vertical cross-section through a model of a portion of an exposed resist is schematically shown. In this example, resist 900 is shown supported on a substrate 920. The resist in this model has been exposed and is being, or has been, developed. A developed or open region 910, such as a trench, between portions of the resist 900 is formed by the development. In this example, the region 910 would have gas therein. Further, as described above, a gel-type layer 930, having a width 950, is provided in this model. The gel-type layer 930 has a parameter of, or associated with, a first viscosity and the resist 900 has a parameter of, or associated with, a second viscosity, wherein the first and second viscosities have different values.

Further, in this model, the gel-type layer 930 extends onto an upper surface of the resist 900 as shown at locations 940. In an embodiment, gel-type layer 930 may not extend onto an upper surface of the resist 900; thus, the gel-type layer 930 is defined only for the side-walls with the region 910.

Figure 12A:
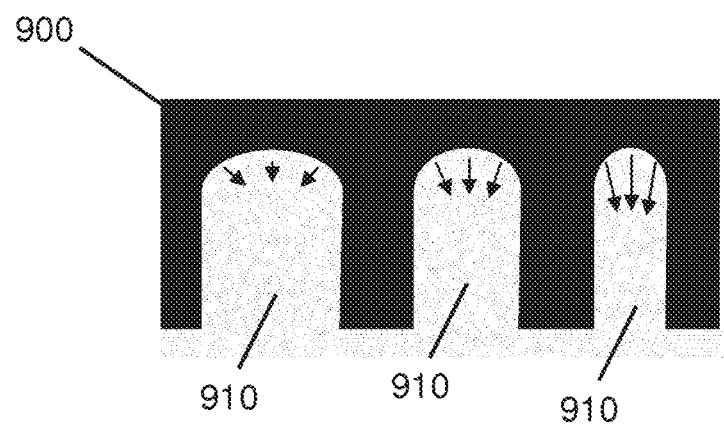
FIG. 12A depicts a schematic top view of a resist model of the present disclosure at a first instance of time.

Referring to FIG. 12A, a top view of an example model of a portion of an exposed resist is schematically shown. In FIG. 12A, regions 910 being developed within a resist 900 are shown. As shown by the arrows, various forces, such as surface tension forces, act on the boundary between the regions 910 and the resist 900 causing the resist to deform in the directions shown by the arrows.

Figure 12B:
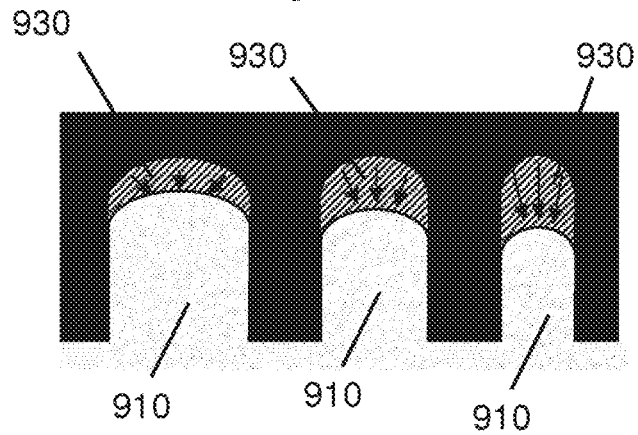
FIG. 12B depicts a schematic top view of a resist model of the present disclosure at a second instance of time.

FIG. 12B is a top view of the exposed resist of FIG. 12A after a certain development time. In this model, a gel-type layer 930 has been defined and the resist 900 is specified so as not to deform at all or very little by being specified as a solid with a relatively high modulus of elasticity or a liquid with a high viscosity compared to the gel-type layer (e.g., 30% or more greater, 50% or more greater, 75% or more greater, 100% or more greater, 200% or more greater, 500% or more greater, or 1000% or more greater). Indeed, the resist 900 may not even need to be specified in the model and instead a boundary condition is applied to the gel-type layer 930. The gel-type layer 930 thus exhibits all, or most, of the deformation into the region 910. The amount of deformation shown in FIG. 12B is not to scale and may be exaggerated compared to a practical example merely to show the nature of the deformation and that it can vary for different sizes and/or shapes of region 910.

Figure 13:
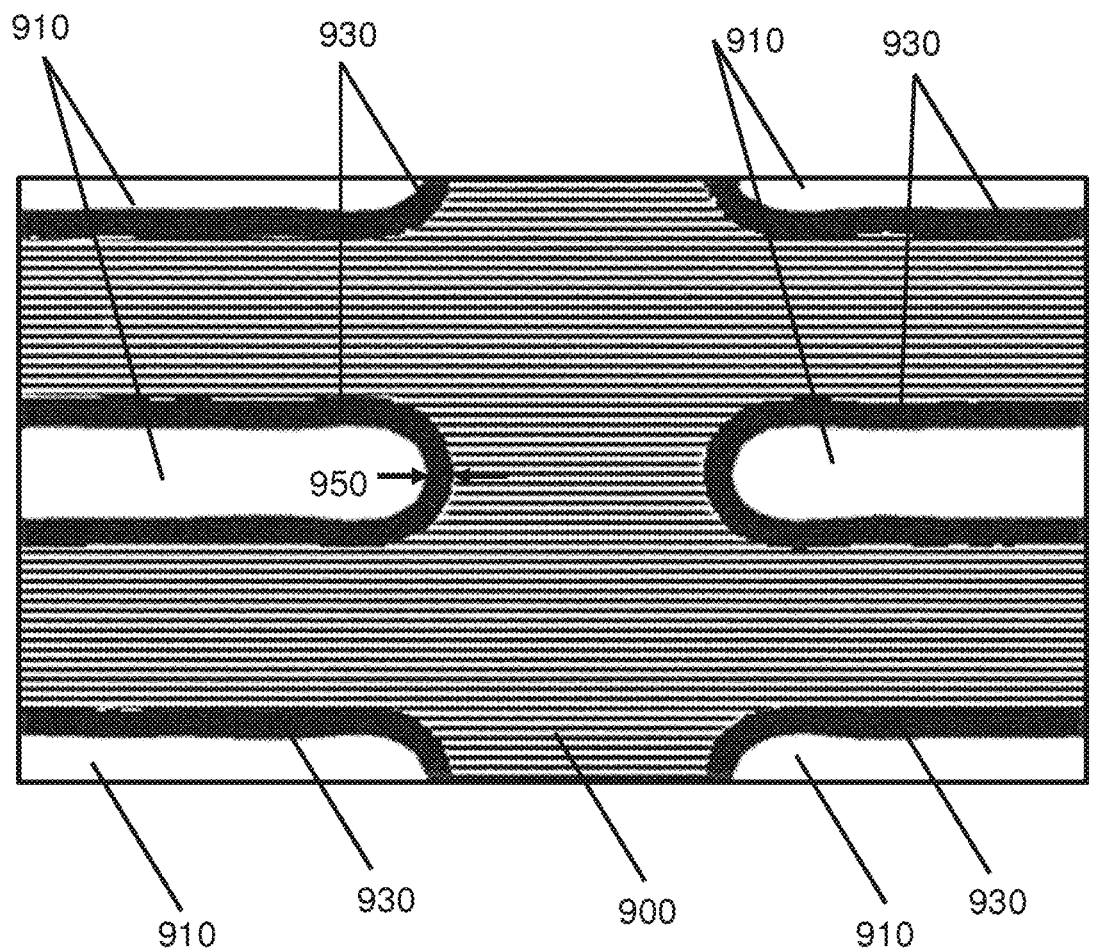
FIG. 13 depicts a schematic top view of a resist model of the present disclosure.

FIG. 13 is a top view of a model of an exposed resist having a gel-type layer defined. In this model, a gel-type layer 930 has been defined for the developed or open regions 910 (e.g., trenches). The resist 900 is specified so as not to deform at all or very little by being specified as a solid with a relatively high modulus of elasticity or a liquid with a high viscosity compared to the gel-type layer (e.g., 30% or more greater, 50% or more greater, 75% or more greater, 100% or more greater, 200% or more greater, 500% or more greater, or 1000% or more greater). Indeed, the resist 900 may not even need to be specified in the model and instead a boundary condition is applied to the gel-type layer 930 that is tantamount to specifying an adjacent region of high viscosity or an adjacent region incapable of any or much deformation. The gel-type layer 930 thus exhibits all, or most, of the deformation into the region 910. In this example, the extension of the gel-type layer 930 on top of the resist 900 is not shown. However, all, or part of, the resist 900 may be covered with gel-type layer 930.

In an embodiment, a calibration sequence similar to as described above can be used to define one or more parameters of a model having a gel-type layer as described above. Or more generally, a calibration sequence similar to as described above can be used to define one or more parameters of a liquid1/liquid2/gas model or of a liquid layer/gas model having a boundary condition on a boundary of the liquid layer opposite to the developed or open region.

In other words, the model can be made up of formulas related to Navier-Stokes equations, such as:

$$\rho \frac{\partial \vec{u}}{\partial t} + \rho \vec{u} \cdot \nabla \vec{u} = -\nabla p + \mu \nabla^2 \vec{u} \qquad (7)$$

wherein $\rho$=density, p=pressure, $\mu$=viscosity and u=velocity. As described above, the parameters/coefficients of the model formulas can be determined by comparison against experimental values (such as measured values from actual exposed and developed resist portions).

As similarly described above, the value of one or more parameters of the fluid dynamics model can be varied for the purposes of fitting as described in more detail above and the simulation run with the varied value(s). In an embodiment, at least one input parameter from the set of input parameters including a parameter of, or associated with, density, a parameter of, or associated with, a parameter of, or associated with, viscosity, a parameter of, or associated with, surface tension, and/or a parameter of, or associated with, time can be varied to obtain the deformation of the resist pattern simulated using the varied value(s). In an embodiment, each of a parameter of, or associated with, density, a parameter of, or associated with, viscosity, a parameter of, or associated with, surface tension, and a parameter of, or associated with, time are capable of being varied—a 4 parameter fit. In an embodiment, density, viscosity, and surface tension are capable of being varied. In an embodiment, a parameter of, or associated with, time, a parameter of, or associated with, viscosity and a parameter of, or associated with, surface tension are capable of being varied. In an embodiment, the fluid dynamics model can be characterized in terms of the Ohnesorge number and so the Ohnesorge number and optionally the time parameter can be varied to obtain a deformation of the resist using the varied value(s). In an embodiment, the fluid dynamics model can be characterized in terms of the capillary number and so the capillary number and optionally the time parameter can be varied to obtain a deformation of the resist using the varied value(s).

In an embodiment, a parameter of, or associated with, viscosity is varied (such as the Ohnesorge number and/or the capillary number). Where the model is characterized in terms of at least two liquids in the resist pattern, wherein each of the at least two liquids has a different viscosity, the parameter of, or associated with, viscosity can be allowed to vary for one liquid but be fixed for the other liquid so that the viscosity is high for that other liquid. In an embodiment, the parameter of, or associated with, viscosity can be separately varied for both liquids. In such a case, a constraint may be imposed such that the viscosity of one liquid becomes or remains different than that of another liquid and desirably, significantly higher for one compared to the other. The constraint can be, for example, in the form of a ratio between the parameter of, or associated with, viscosity for one liquid and the parameter of, or associated with, viscosity for another liquid, in the form of an offset in the value of parameter of, or associated with, viscosity for one liquid relative to the parameter of, or associated with, viscosity for another liquid, etc.

Where the model is characterized in terms of a boundary liquid layer located at a boundary between the resist and a developed or open region of the resist pattern, wherein the boundary liquid layer has a width smaller than the width of the resist at the boundary, the parameter of, or associated with, viscosity for the boundary liquid layer can be varied subject to an appropriate boundary condition at the side of the boundary liquid layer opposite to the developed or open region. For example, the boundary condition applied to the boundary liquid layer can be tantamount to specifying an adjacent region of high viscosity or an adjacent region incapable of any or much deformation.

In an embodiment, the parameter of, or associated with, viscosity can be separately varied for both liquids. In such a case, a constraint may be imposed such that the viscosity of one liquid remain different than that of another liquid and desirably, significantly higher for one compared to the other. The constraint can be, for example, in the form of a ratio between the parameter of, or associated with, viscosity for one liquid and the parameter of, or associated with, viscosity for another liquid, in the form of an offset in the value of parameter of, or associated with, viscosity for one liquid relative to the parameter of, or associated with, viscosity for another liquid, etc.

Further, where the model is characterized in terms of at least two liquids in the resist pattern, wherein each of the at least two liquids has a different viscosity or is characterized in terms of a boundary liquid layer located at a boundary between the resist and a developed or open region of the resist pattern, wherein the boundary liquid layer has a width smaller than the width of the resist at the boundary, the model may be further specified in terms of a parameter of, or associated with, a width (such as width 950) of the second liquid or of the boundary liquid layer. Where the second liquid or boundary liquid layer is located at an upper surface of resist, the width may be considered the thickness.

In an embodiment, the width may be a pre-determined amount, e.g., specified by a user and desirably selected such that it is larger than the largest expected deformation toward the essentially insoluble resist. In an embodiment, the width is selected from a range of from 5 nm to 300 nm, a range of from 5 nm to 200 nm, a range of from 5 nm to 100 nm, a range of from 5 nm to 50 nm, a range of from 10 nm to 40 nm, or a range of from 5 nm to 30 nm, or a range of from 5 nm to 20 nm. In such an embodiment, the width may not be varied as part of the calibration routine. Or, in an embodiment, the pre-determined width may be a starting point and the width may be varied like a parameter of, or associated with, viscosity, etc.

In an embodiment, the width may be a range (such as the ranges described just above), which range can act as a constraint. Thus, in such an embodiment, a certain width can be a starting point and the width may be varied like a parameter of, or associated with, viscosity, etc., but constrained within the range given.

In an embodiment, the width can vary at different locations in the second liquid or in the boundary liquid layer. For example, the width can be different in different developed or open regions or at different parts along a developed or open region. As another example, the width can be different at an upper surface of the resist rather than in a sidewall of a developed region. In an embodiment, a relationship (e.g., a ratio) can be specified between the sidewall width and the upper surface width so as to constrain the difference in width.

So, in an embodiment, when short-range interaction of forces is desirable, a region of material having a finite (and relatively small such as 30 nm or less) width can be defined at a boundary of a developed or open region and a resist, the region at the boundary having a width smaller than the resist at the boundary. On the side opposite of the developed or open region, the model can have another material, e.g., a liquid, that does not deform or deforms significantly less than the material of the region having the finite width (e.g., has a significantly higher viscosity than the material of the region having the finite width) or have a boundary condition that tantamount specifies low or no deformation at that location. As a result, the velocity field at the opposite side can be at or close to zero, thus leading to little or no changes in deformation at that location (and at outward locations therefrom until another region of finite width is encountered). Such little or no changes can be advantageous for when the deformations calculated using the fluid dynamics model is used in another processing tool, such as ASML's Tachyon software, for OPC or other computational lithography purposes. For example, the deformation may lead to aerial image intensity variations in ASML's Tachyon that hinder OPC processing by that software.

Figure 14:
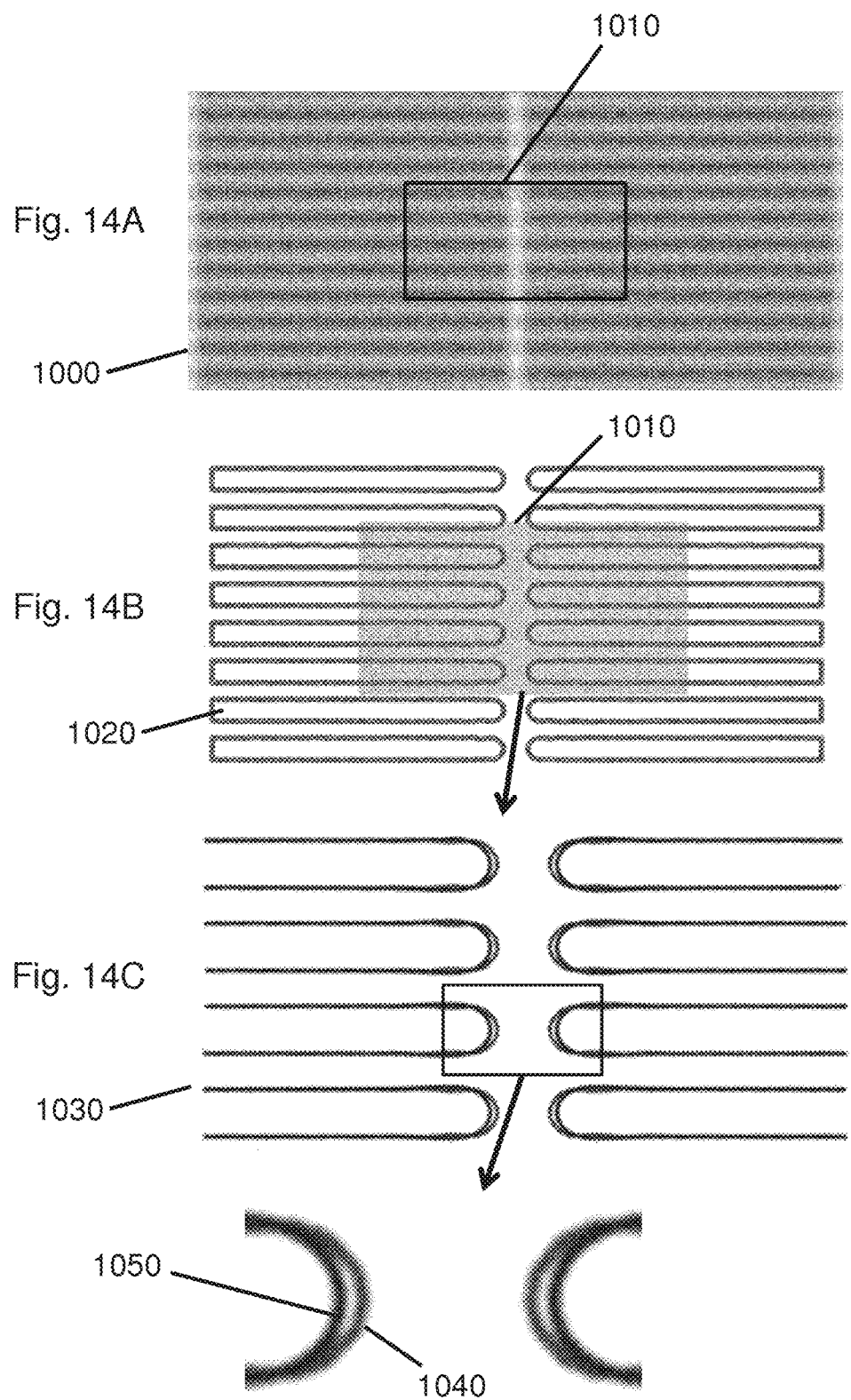
FIG. 14A, FIG. 14B and FIG. 14C depict stages of use of a resist model of the present disclosure.

Referring to FIGS. 14A, 14B and 14C, an example of a calibration sequence of a fluid dynamics model is depicted at a high level. In FIG. 14A, an image (e.g., an aerial image) 1000 of a pattern against which a fluid dynamic model is being calibrated is determined using, for example, a computational lithography tool such as ASML's Tachyon software. Contours can be extracted for the pattern shown in FIG. 14A using an appropriate contour extraction procedure and associated threshold (e.g., transition from a certain intensity to another intensity exceeding or below a certain threshold can be considered a location of a contour). An example of such contours 1020 is shown in FIG. 14B.

Using the contours, such as shown in FIG. 14B, the fluid dynamics model is run against the contours while varying at least one parameter of the fluid dynamics model (such as a parameter of, or associated with viscosity and/or with a width of a finite layer as discussed herein). The resulting determined extent of deformation is evaluated against experimental results (e.g., one or more measured values of an actual exposed and developed instance of the pattern) with, e.g., the aim of varying the at least one parameter of the fluid dynamics model until the error between corresponding predicted values determined using the fluid dynamics model and experimental values is minimized. This process can be repeated for one or more further different contour extraction thresholds and/or one or more other contour extraction methods so as to improve the fluid dynamics model (e.g., to improve the robustness of the fluid dynamics model to different input patterns).

The calibrated model can then output an image of a pattern that shows the deformation of the pattern arising from, e.g., surface tension effects. Referring to FIG. 14C, a comparison 1030 is shown of the contour of FIG. 14B in the region 1010 (corresponding to the same region 1010 in FIG. 14A) with a contour as predicted using the calibrated model. The inset in FIG. 14C shows a close up of the comparison 1030 and it can be seen that the contour 1050 as predicted by the fluid dynamics model is different (and more improved) than the contour 1040 of FIG. 14B (which was extracted from an image produced by a computational lithography tool).

So, in sum, the effect of intrafluid forces, such as surface tension, on a resist pattern is included in a prediction of a resist pattern using a computational fluid dynamics model. Data regarding the resist pattern (such as an optical image (or image derived therefrom) produced using, e.g., ASML's Tachyon product) can be used as an input to the model. In an embodiment, to speed processing, it is binarized to areas that are assumed to be fully developed and a remainder. The remainder resist is treated as a fluid on a laminar two-phase flow field and with constant or non-constant viscosity. Then, intrafluid forces are effectively modeled such as surface tension applied on the boundaries of the developed resist. The model determines, for example, fluid velocity and pressure and consequently the deformation of the resist is calculated by solving fluid dynamics equations such as the Navier-Stokes equations. Thus, fluid dynamics are used to enable resist profile prediction and the fluid dynamics model can efficiently include, e.g., surface tension effects. In particular, in an embodiment, strain and curvature effects of highly dense patterned shapes are captured by using fluid dynamics.

To make the model suitable for a particular patterning process where values of physical and materials parameters are not known (e.g., where the viscosity, density, etc. is not known), the model is fitted (e.g., by regression) to measured values on actual deformed features (e.g., experimental CD values in X and Y directions). Further, in an embodiment, the model can account for effects through the thickness of the resist by including a time-dependent liquid density parameter.

So, in an embodiment, there is provided a method that determines resist deformation which can balance accuracy and speed to allow relatively easy integration of resist deformation prediction into existing processes and algorithms for patterning process configuration. For example, in an embodiment, there is provided a fluid dynamics model than can provide better prediction of the deformation of a resist pattern than past modeling. Additionally or alternatively, the fluid dynamics model can provide faster deformation predictions than past modeling. In an embodiment, the resulting fluid dynamics model can be better than existing resist pattern predictions made by a computational lithography tool for, e.g., OPC and/or SMO. Accordingly, in an embodiment, the fluid dynamics model can be used in such a tool to make pattern computations and predictions.

In an embodiment, there is provided a method, comprising: obtaining a resist deformation model for simulating a deformation process of a pattern in resist, the resist deformation model being a fluid dynamics model configured to simulate an intrafluid force acting on the resist; performing, by a hardware computer system and using the resist deformation model, a computer simulation of the deformation process to obtain a deformation of the developed resist pattern for an input pattern to the resist deformation model; and producing electronic data representing the deformation of the developed resist pattern for the input pattern.

In an embodiment, the fluid dynamics model is based on Navier-Stokes flow equations. In an embodiment, the intrafluid force relates at least to surface tension. In an embodiment, the input pattern is provided to resist deformation model in the form of an image of the input pattern. In an embodiment, the image is a binary image. In an embodiment, the electronic data representing the deformation is an image of the deformed developed resist pattern. In an embodiment, the deformation is determined at a plurality of locations, each location corresponding to a point that lies on a boundary of a developed portion of the developed resist pattern for the input pattern. In an embodiment, the resist is a negative tone resist or a positive tone resist. In an embodiment, the resist deformation model is specified for at least two liquids in the resist pattern, wherein each of the at least two liquids has a different viscosity. In an embodiment, the resist deformation model is specified for a boundary liquid layer located at a boundary between the resist and a developed or open region in the resist pattern, wherein the boundary liquid layer has a width smaller than the width of the resist at the boundary. In an embodiment, the resist deformation model has specified therein a material layer at an upper surface of the resist, the material layer having a different viscosity than the resist.

In an embodiment, there is provided a method, comprising: initializing a resist deformation model for simulating a deformation process of a portion of a pattern in resist, the resist deformation model being a fluid dynamics model configured to simulate an intrafluid force acting on the resist; and performing, by a hardware computer system, a computer simulation of the deformation process using the fluid dynamics model to obtain a deformation of a developed resist pattern corresponding to an input pattern, the simulation being performed for a plurality of iterations until a criteria is satisfied, wherein in each iteration at least one parameter associated with the fluid dynamics model is updated.

In an embodiment, the fluid dynamics model is based on Navier-Stokes flow equations. In an embodiment, the intrafluid force relates at least to surface tension. In an embodiment, the deformation is determined at a plurality of locations, each location corresponding to a point that lies on a boundary of a developed portion of the developed resist pattern for the input pattern. In an embodiment, the deformation of the developed resist pattern is obtained at a location by computing at least a velocity vector corresponding to a pixel, at the location, of an image associated with the input pattern. In an embodiment, the at least one parameter associated with the fluid dynamics model comprises or relates to density of the resist, viscosity of the resist, surface tension of the resist, and/or time. In an embodiment, the density of the resist, the viscosity of the resist, and the surface tension of the resist are related to each other by an Ohnesorge number corresponding to the resist or wherein the viscosity of the resist and the surface tension of the resist are related to each other by a capillary number. In an embodiment, the at least one parameter modified at each iteration of the computer simulation is an Ohnesorge number or a capillary number of the resist. In an embodiment, the at least one parameter modified at each iteration of the computer simulation comprises the density of the resist, the viscosity of the resist, the surface tension of the resist, and/or time. In an embodiment, the method further comprises computing, using the fluid dynamics model, a critical dimension between a pair of locations disposed on a boundary of the developed resist pattern; and calculating an error between the computed critical dimension and a measured critical dimension of an actual developed resist pattern. In an embodiment, the criteria corresponds to the calculated error being meeting or crossing a certain error threshold. In an embodiment, the method further comprises obtaining values of parameters of the fluid dynamics model upon the criteria being satisfied; receiving a layout of another input pattern; and creating electronic data regarding deformation of a developed resist pattern corresponding to the other input pattern using the fluid dynamics model based on the obtained values of the parameters of the fluid dynamics model. In an embodiment, the resist is a negative tone resist or a positive tone resist. In an embodiment, the input pattern is in the form of a binary image.

In an embodiment, the method further comprises generating the binary image, the generating comprising: obtaining a patterning device pattern corresponding to the input pattern; producing an aerial image based on the patterning device pattern; and extracting boundaries of the pattern in the aerial image to generate the binary image. In an embodiment, the initializing step further comprises applying a set of boundary conditions to the fluid dynamics model. In an embodiment, the set of boundary conditions comprises setting a pressure value of the resist at a boundary of the developed resist pattern to zero. In an embodiment, the resist deformation model is specified for at least two liquids in the resist pattern, wherein each of the at least two liquids has a different viscosity. In an embodiment, the at least one parameter includes a parameter of, or associated with, viscosity of at least one liquid of the at least two liquids. In an embodiment, the at least one parameter includes a parameter of, or associated with, a width of a layer of at least one liquid of the at least two liquids. In an embodiment, the resist deformation model is specified for a boundary liquid layer located at a boundary between the resist and a developed region in the resist pattern, wherein the boundary liquid layer has a width smaller than the width of the resist at the boundary. In an embodiment, the at least one parameter includes a parameter of, or associated with, viscosity of the boundary liquid layer. In an embodiment, the at least one parameter includes a parameter of, or associated with, a width of the boundary liquid layer. In an embodiment, the resist deformation model has specified therein a material layer at the upper surface of the resist having a different viscosity than the resist or a remaining portion of the resist.

In an embodiment, there is provided a method, comprising: obtaining a resist deformation model for simulating a deformation process of a pattern in resist, the resist deformation model being a fluid dynamics model having defined therein a region of material of finite width at a boundary of a resist and a developed or open region, the region at the boundary having a width smaller than the resist at the boundary; performing, by a hardware computer system and using the resist deformation model, a computer simulation of the deformation process to obtain a deformation of a developed resist pattern for an input pattern to the resist deformation model; and producing electronic data representing the deformation of the developed resist pattern for the input pattern.

In an embodiment, the model has defined therein, on a side of the region having finite width located opposite of the developed or open region, another material that does not deform or deforms less than the material of the region having the finite width. In an embodiment, the material of the region having the finite width comprises liquid, the other material comprises a liquid and the viscosity of the material of the region having the finite width is less than the viscosity of the other material. In an embodiment, the model has defined therein, on a side of the region having finite width located opposite of the developed or open region, a boundary condition that tantamount specifies at that location no deformation or less deformation than the material of the region having the finite width at that location. In an embodiment, the resist deformation model has specified therein a material layer at the upper surface of the resist having a different viscosity than the resist.

The embodiments may further be described using the following clauses:

1. A method, comprising:
   obtaining a resist deformation model for simulating a deformation process of a pattern in resist, the resist deformation model being a fluid dynamics model configured to simulate an intrafluid force acting on the resist;
   performing, by a hardware computer system and using the resist deformation model, a computer simulation of the deformation process to obtain a deformation of a developed resist pattern for an input pattern to the resist deformation model; and producing electronic data representing the deformation of the developed resist pattern for the input pattern.
2. The method of clause 1, wherein the fluid dynamics model is based on Navier-Stokes flow equations.
3. The method of clause 1 or clause 2, wherein the intrafluid force relates at least to surface tension.
4. The method of any of clauses 1-3, wherein the input pattern is provided to the resist deformation model in the form of an image of the input pattern.
5. The method of clause 4, wherein the image is a binary image.
6. The method of any of clauses 1-5, wherein the electronic data representing the deformation is an image of the deformed developed resist pattern.
7. The method of any of clauses 1-6, wherein the deformation is determined at a plurality of locations, each location corresponding to a point that lies on a boundary of a developed or open portion of the developed resist pattern for the input pattern.
8. The method of any of clauses 1-7, wherein the resist is a negative tone resist or a positive tone resist.
9. The method of any of clauses 1-8, wherein the resist deformation model is specified for at least two liquids in the resist pattern, wherein each of the at least two liquids has a different viscosity.
10. The method of any of clauses 1-8, wherein the resist deformation model is specified for a boundary liquid layer located at a boundary between the resist and a developed or open region in the resist pattern, wherein the boundary liquid layer has a width smaller than the width of the resist at the boundary.

11. The method of any of clauses 1-10, wherein the resist deformation model has specified therein a material layer at an upper surface of the resist, the material layer having a different viscosity than the resist or a remaining portion of the resist.

12. A method, comprising:

initializing a resist deformation model for simulating a deformation process of a portion of a pattern in resist, the resist deformation model being a fluid dynamics model configured to simulate an intrafluid force acting on the resist; and performing, by a hardware computer system, a computer simulation of the deformation process using the fluid dynamics model to obtain a deformation of a developed resist pattern corresponding to an input pattern, the simulation being performed for a plurality of iterations until a criteria is satisfied, wherein in each iteration at least one parameter associated with the fluid dynamics model is updated.

13. The method of clause 12, wherein the fluid dynamics model is based on Navier-Stokes flow equations.

14. The method of clause 12 or clause 13, wherein the intrafluid force relates at least to surface tension.

15. The method of any of clauses 12-14, wherein the deformation is determined at a plurality of locations, each location corresponding to a point that lies on a boundary of a developed portion of the developed resist pattern for the input pattern.

16. The method of any of clauses 12-15, wherein the deformation of the developed resist pattern is obtained at a location by computing at least a velocity vector corresponding to a pixel, at the location, of an image associated with the input pattern.

17. The method of any of clauses 12-16, wherein the at least one parameter associated with the fluid dynamics model comprises or relates to density of the resist, viscosity of the resist, surface tension of the resist, and/or time.

18. The method of clause 17, wherein the density of the resist, the viscosity of the resist, and the surface tension of the resist are related to each other by an Ohnesorge number corresponding to the resist or wherein the viscosity of the resist and the surface tension of the resist are related to each other by a capillary number.

19. The method of any of clauses 12-18, wherein the at least one parameter modified at each iteration of the computer simulation is an Ohnesorge number or a capillary number of the resist.

20. The method of any of clauses 12-19, wherein the at least one parameter modified at each iteration of the computer simulation comprises the density of the resist, the viscosity of the resist, the surface tension of the resist, and/or time.

21. The method of any of clauses 12-20, further comprising:

computing, using the fluid dynamics model, a dimension between a pair of locations disposed on a boundary of the developed resist pattern; and calculating an error between the computed dimension and a measured dimension of an actual developed resist pattern.

22. The method of clause 21, wherein the criteria corresponds to the calculated error meeting or crossing a certain error threshold.

23. The method of any of clauses 12-22, further comprising:

obtaining values of parameters of the fluid dynamics model upon the criteria being satisfied;

receiving a layout of another input pattern; and creating electronic data regarding deformation of a developed resist pattern corresponding to the other input pattern using the fluid dynamics model based on the obtained values of the parameters of the fluid dynamics model.

24. The method of any of clauses 12-23, wherein the resist is a negative tone resist or a positive tone resist.

25. The method of any of clauses 12-24, wherein the input pattern is in the form of a binary image.

26. The method of clause 25, further comprising generating the binary image, the generating comprising:

obtaining a patterning device pattern corresponding to the input pattern;

producing an aerial image based on the patterning device pattern; and extracting boundaries of the pattern in the aerial image to generate the binary image.

27. The method of any of clauses 12-26, wherein the initializing step further comprises applying a set of boundary conditions to the fluid dynamics model.

28. The method of clause 27, wherein the set of boundary conditions comprises setting a pressure value of the resist at a boundary of the developed resist pattern to zero.

29. The method of any of clauses 12-28, wherein the resist deformation model is specified for at least two liquids in the resist pattern, wherein each of the at least two liquids has a different viscosity.

30. The method of clause 29, wherein the at least one parameter includes a parameter of, or associated with, viscosity of at least one liquid of the at least two liquids.

31. The method of clause 29 or clause 30, wherein the at least one parameter includes a parameter of, or associated with, a width of a layer of at least one liquid of the at least two liquids.

32. The method of any of clauses 12-28, wherein the resist deformation model is specified for a boundary liquid layer located at a boundary between the resist and a developed region in the resist pattern, wherein the boundary liquid layer has a width smaller than the width of the resist at the boundary.

33. The method of clause 32, wherein the at least one parameter includes a parameter of, or associated with, viscosity of the boundary liquid layer.

34. The method of clause 32 or clause 33, wherein the at least one parameter includes a parameter of, or associated with, a width of the boundary liquid layer.

35. The method of any of clauses 12-34, wherein the resist deformation model has specified therein a material layer at the upper surface of the resist having a different viscosity than the resist or a remaining portion of the resist.

36. A method, comprising:

obtaining a resist deformation model for simulating a deformation process of a pattern in resist, the resist deformation model being a fluid dynamics model having defined therein a region of material of finite width at a boundary of a resist and a developed or open region, the region at the boundary having a width smaller than the resist at the boundary;

performing, by a hardware computer system and using the resist deformation model, a computer simulation of the deformation process to obtain a deformation of a developed resist pattern for an input pattern to the resist deformation model; and producing electronic data representing the deformation of the developed resist pattern for the input pattern.

37. The method of clause 36, wherein the model has defined therein, on a side of the region having finite width located opposite of the developed or open region, another material that does not deform or deforms less than the material of the region having the finite width.

38. The method of clause 37, wherein the material of the region having the finite width comprises liquid, the other material comprises a liquid and the viscosity of the material of the region having the finite width is less than the viscosity of the other material.

39. The method of clause 36, wherein the model has defined therein, on a side of the region having finite width located opposite of the developed or open region, a boundary condition that tantamount specifies at that location no deformation or less deformation than the material of the region having the finite width at that location.

40. The method of any of clauses 36-39, wherein the resist deformation model has specified therein a material layer at the upper surface of the resist having a different viscosity than the resist or a remaining portion of the resist.

41. A non-transitory computer program product comprising machine-readable instructions for causing a processor to cause performance of the method of any of clauses 1-40.

42. A system, comprising
a hardware processor; and
the non-transitory computer program product of clause 41.

Figure 15:
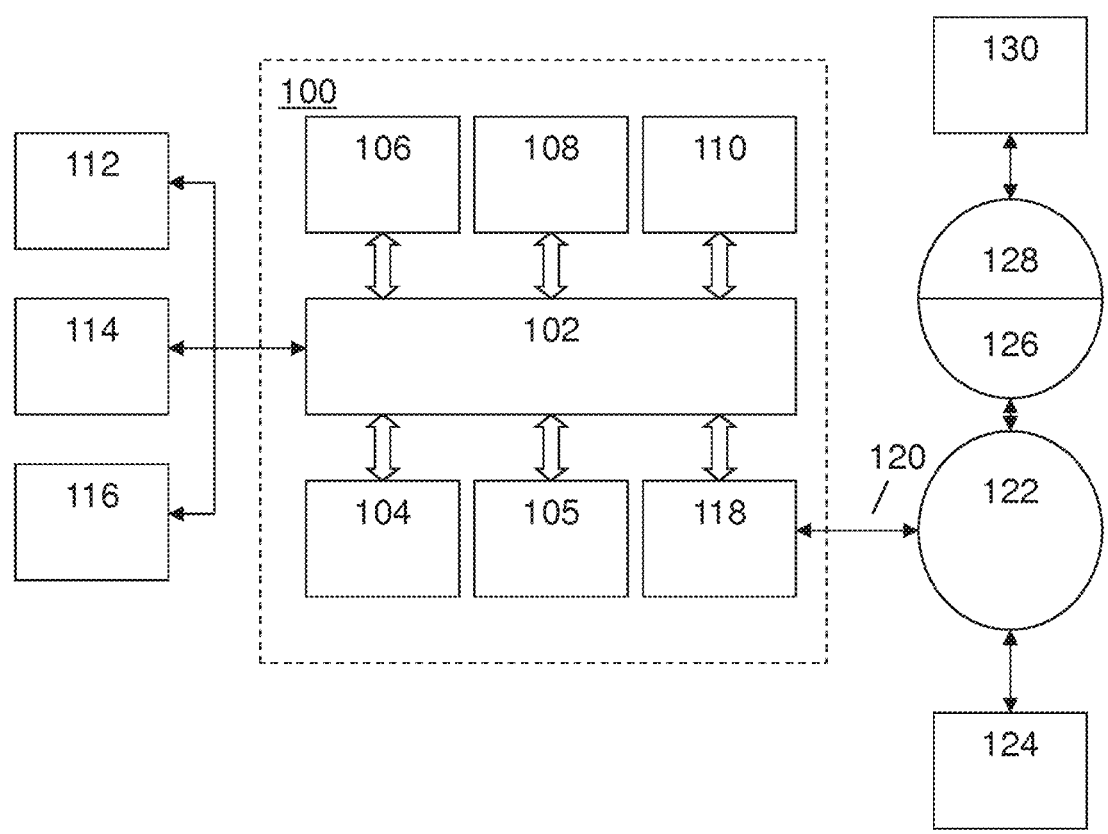
FIG. 15 is a block diagram of an example computer system.

FIG. 15 is a block diagram that illustrates a computer system 100 which perform one or more aspects of the methods and flows disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of a process described herein may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also preferably includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented.

In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide for a process as described herein, for example. The received code may be executed by processor 104 as it is received, and/or stored in storage device 110, or other non-volatile storage for later execution. In this manner, computer system 100 may obtain application code in the form of a carrier wave.

Figure 16:
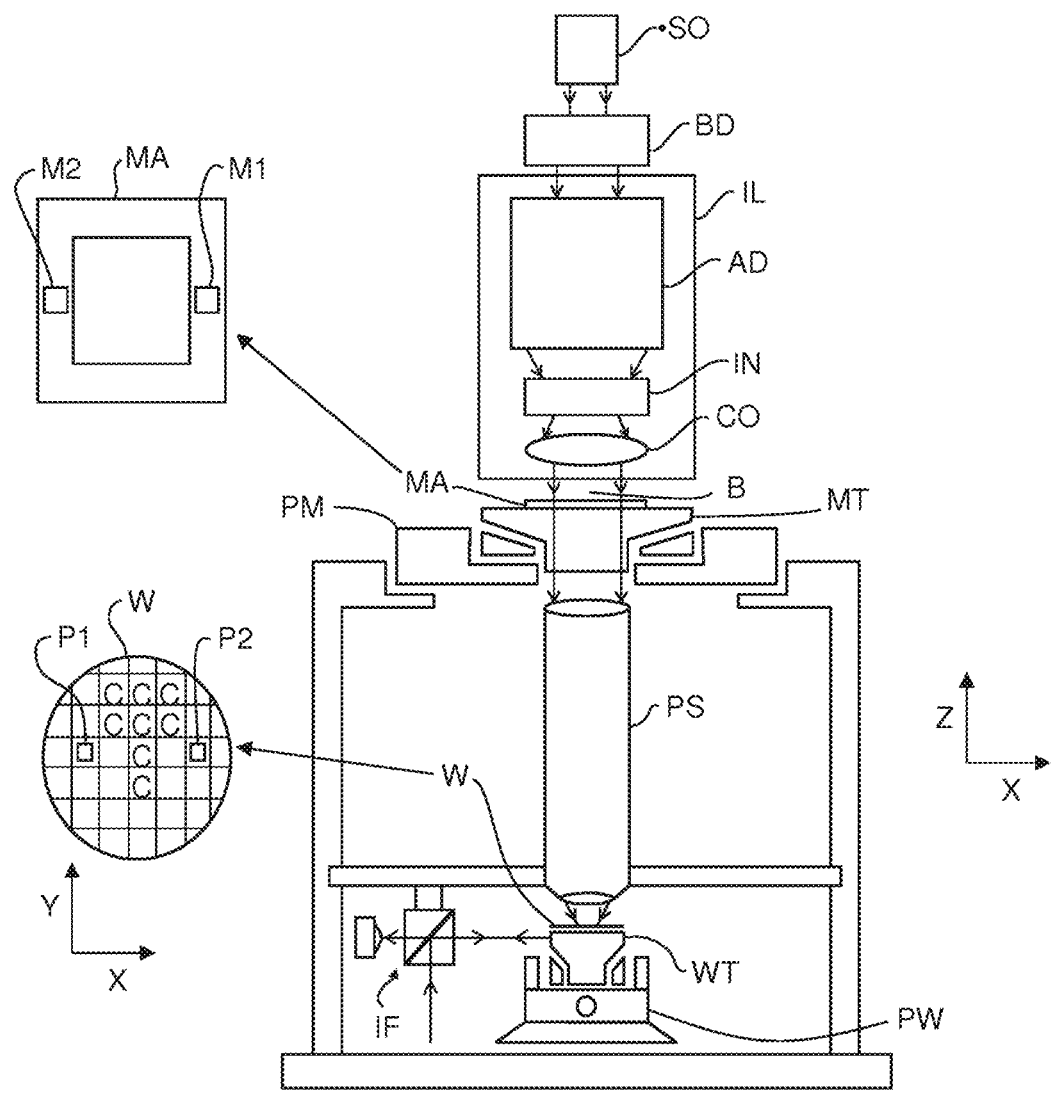
FIG. 16 is a schematic diagram of a lithography projection apparatus.

FIG. 16 schematically depicts an exemplary lithographic projection apparatus for use with the methods described herein. The apparatus comprises:
- an illumination system IL, to condition a beam B of radiation. In this particular case, the illumination system also comprises a radiation source SO;
- a first object table (e.g., mask table) MT provided with a patterning device holder to hold a patterning device MA (e.g., a reticle), and connected to a first positioner to accurately position the patterning device with respect to item PS;
- a second object table (substrate table) WT provided with a substrate holder to hold a substrate W (e.g., a resist-coated silicon wafer), and connected to a second positioner to accurately position the substrate with respect to item PS;
- a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive mask). However, in general, it may also be of a reflective type, for example (with a reflective mask). Alternatively, the apparatus may employ another kind of patterning device as an alternative to the use of a classic mask; examples include a programmable mirror array or LCD matrix.

The source SO (e.g., a mercury lamp or excimer laser) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 16 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or $F_2$ lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 16. However, in the case of a wafer stepper (as opposed to a step-and-scan tool) the patterning device table MT may just be connected to a short stroke actuator, or may be fixed.

The depicted tool can be used in two different modes:
- In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;
- In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

Figure 17:
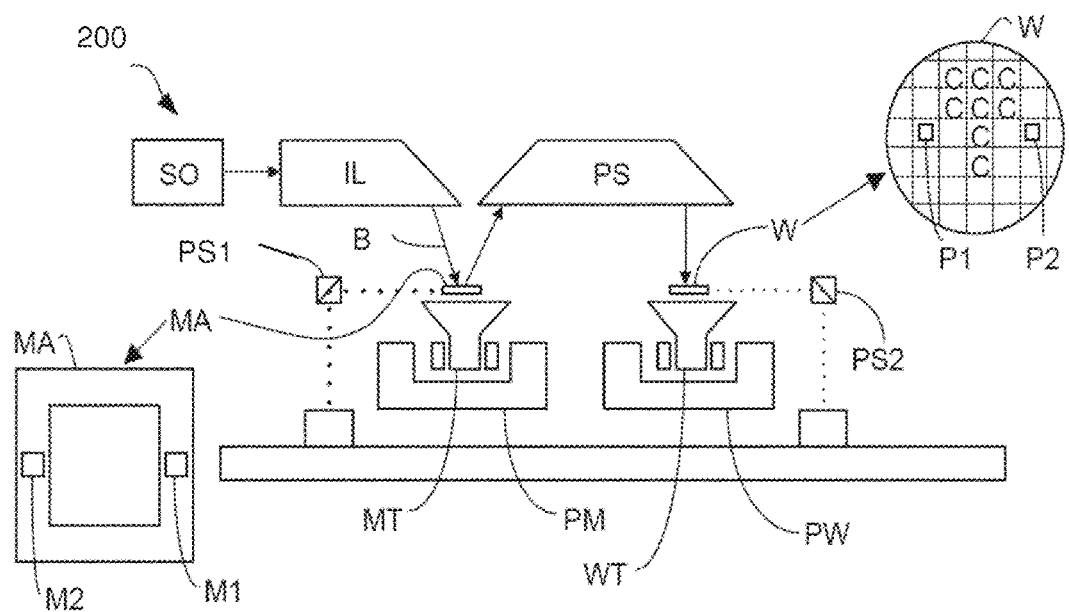
FIG. 17 is a schematic diagram of another lithography projection apparatus.

FIG. 17 schematically depicts another exemplary lithographic projection apparatus 200 that can be used for the methods described herein. The lithographic projection apparatus 200 includes:
- a source collector module SO
- an illumination system (illuminator) IL configured to condition a radiation beam B (e.g. EUV radiation).
- a support structure (e.g. a mask table) MT constructed to support a patterning device (e.g. a mask or a reticle) MA and connected to a first positioner PM configured to accurately position the patterning device;
- a substrate table (e.g. a wafer table) WT constructed to hold a substrate (e.g. a resist coated wafer) W and connected to a second positioner PW configured to accurately position the substrate; and a projection system (e.g. a reflective projection system) PS configured to project a pattern imparted to the radiation beam B by patterning device MA onto a target portion C (e.g. comprising one or more dies) of the substrate W.

As here depicted, the apparatus 200 is of a reflective type (e.g. employing a reflective mask). It is to be noted that because most materials are absorptive within the EUV wavelength range, the mask may have multilayer reflectors comprising, for example, a multi-stack of molybdenum and silicon. In one example, the multi-stack reflector has a 40 layer pairs of molybdenum and silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 17, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 17, for providing the laser beam exciting the fuel. The resulting plasma emits output radiation, e.g., EUV radiation, which is collected using a radiation collector, disposed in the source collector module. The laser and the source collector module may be separate entities, for example when a $CO_2$ laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the source may be an integral part of the source collector module, for example when the source is a discharge produced plasma EUV generator, often termed as a DPP source.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as faceted field and pupil mirror devices. The illuminator may be used to condition the radiation beam, to have a desired uniformity and intensity distribution in its cross section.

The radiation beam B is incident on the patterning device (e.g., mask) MA, which is held on the support structure (e.g., mask table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus 200 could be used in at least one of the following modes:

1. In step mode, the support structure (e.g. mask table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.
2. In scan mode, the support structure (e.g. mask table) MT and the substrate table WT are scanned synchronously while a pattern imparted to the radiation beam is projected onto a target portion C (i.e. a single dynamic exposure). The velocity and direction of the substrate table WT relative to the support structure (e.g. mask table) MT may be determined by the (de-)magnification and image reversal characteristics of the projection system PS.
3. In another mode, the support structure (e.g. mask table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to mask less lithography that utilizes programmable patterning device, such as a programmable mirror array of a type as referred to above.

Figure 18:
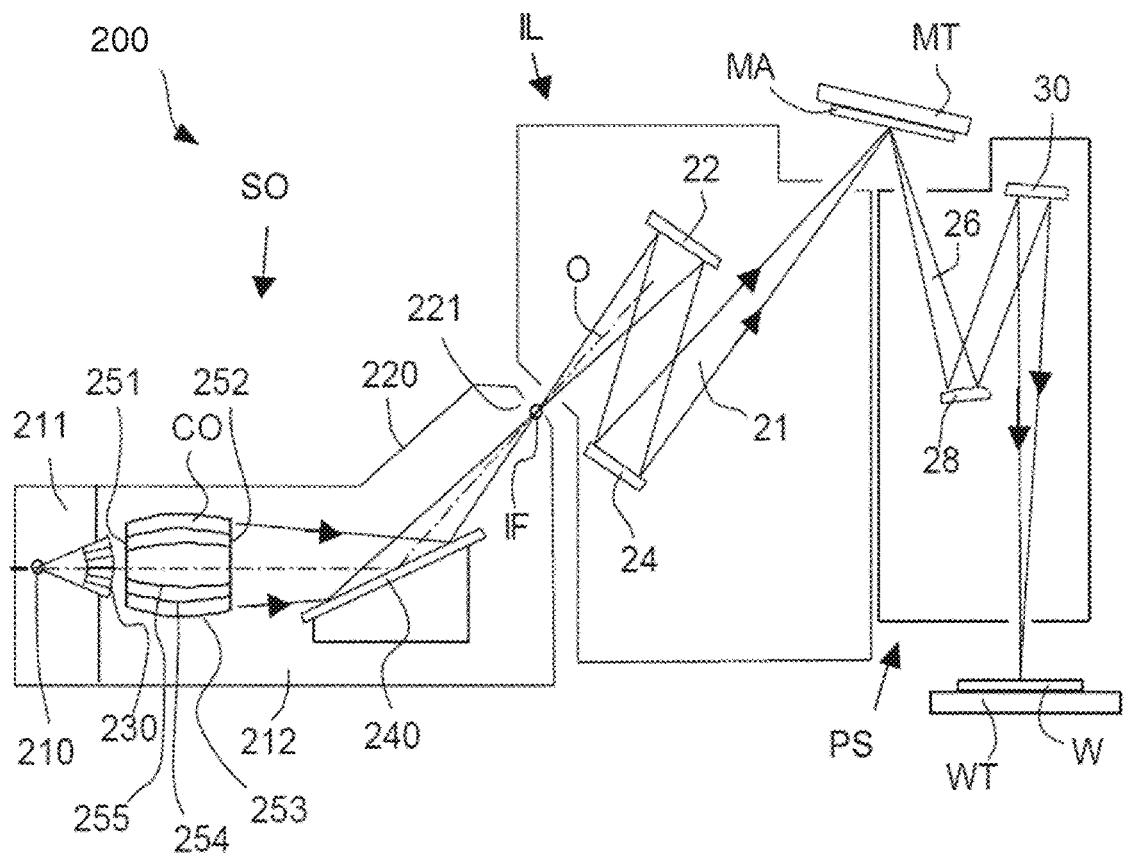
FIG. 18 is a more detailed view of the apparatus of FIG. 17.

FIG. 18 shows the apparatus 200 in more detail, including the source collector module SO, the illumination system IL, and the projection system PS. The source collector module SO is constructed and arranged such that a vacuum environment can be maintained in an enclosing structure 220 of the source collector module SO. A EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap), which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the Figures, for example there may be 1-6 additional reflective elements present in the projection system PS than shown in FIG. 18.

Collector optic CO, as illustrated in FIG. 18, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type is preferably used in combination with a discharge produced plasma source, often called a DPP source.

Figure 19:
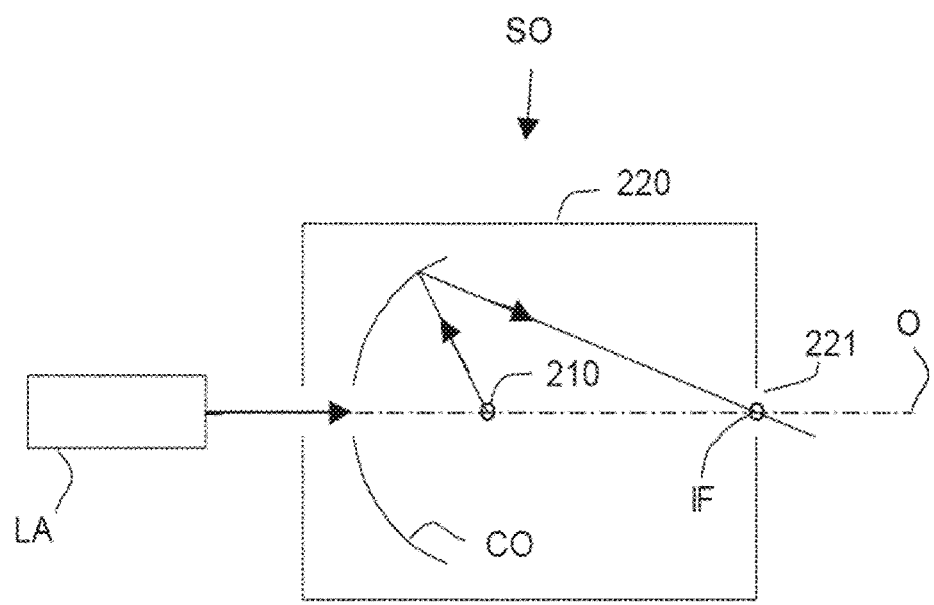
FIG. 19 is a more detailed view of the source collector module of the apparatus of FIG. 17 and FIG. 18.

Alternatively, the source collector module SO may be part of an LPP radiation system as shown in FIG. 19. A laser LA is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

Although specific reference may be made in this text to the manufacture of devices such as ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

It is noted that the terms "mask", "reticle", and "patterning device" are utilized interchangeably herein. Also, a person skilled in the art will recognize that, especially in the context of lithography simulation/optimization, the term "mask"/"patterning device" and "design layout" can be used interchangeably, as in lithography simulation/optimization, a physical patterning device is not necessarily used but a design layout can be used to represent a physical patterning device.

In the present document, the terms "radiation" and "beam" are used to encompass all types of electromagnetic radiation, including ultraviolet radiation (e.g. with a wavelength of 365, 248, 193, 157 or 126 nm) and extreme ultra-violet radiation (EUV), e.g. having a wavelength in the range 5-20 nm).

The terms "optimizing" and "optimization" as used herein mean adjusting a lithographic projection apparatus and/or a patterning process such that results and/or processes of the patterning process (such as lithography) have a more desirable characteristic, such as higher accuracy of projection of design layouts on a substrate, a larger process window, etc. The terms "optimizing" and "optimization" do not necessarily require that results and/or processes of lithography have the most desirable characteristics, such as highest accuracy of projection of design layouts on a substrate, largest process window, etc.

The patterning device referred to above comprises or can form design layouts. The design layouts can be generated utilizing CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between circuit devices (such as gates, capacitors, etc.) or interconnect lines, so as to ensure that the circuit devices or lines do not interact with one another in an undesirable way. The design rule limitations are typically referred to as "critical dimensions" (CD). A critical dimension of a circuit can be defined as the smallest width of a line or hole or the smallest space between two lines or two holes. Thus, the CD determines the overall size and density of the designed circuit. Of course, one of the goals in integrated circuit fabrication is to faithfully reproduce the original circuit design on the substrate (via the patterning device).

The term "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include a programmable mirror array and/or a programmable LCD array.

The concepts disclosed herein may simulate or mathematically model any patterning process, and may be especially useful with imaging technologies capable of producing increasingly shorter wavelengths. Examples of such imaging technologies already in use include EUV (extreme ultra violet), DUV lithography that is capable of producing a 193 nm wavelength with the use of an ArF laser and/or a 157 nm wavelength with the use of a fluorine laser. Moreover, EUV lithography is capable of producing wavelengths within a range of about 5 nm to about 20 nm by using, e.g., a synchrotron or by hitting a material (either solid or a plasma) with high energy electrons in order to produce photons within this range.

While the concepts disclosed herein may be used for patterning processes involving imaging on a substrate such as a silicon wafer, it shall be understood that the disclosed concepts may be used with any type of lithographic systems, e.g., those used for imaging on substrates other than silicon wafers.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The reader should appreciate that the present application describes several inventions. Rather than separating those inventions into multiple isolated patent applications, these inventions have been grouped into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to cost constraints, some inventions disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such inventions or all aspects of such inventions.

It should be understood that the description and the drawings are not intended to limit the present disclosure to the particular form disclosed, but to the contrary, the intention is to cover all modifications, equivalents, and alternatives falling within the spirit and scope of the inventions as defined by the appended claims.

Modifications and alternative embodiments of various aspects of the inventions will be apparent to those skilled in the art in view of this description. Accordingly, this description and the drawings are to be construed as illustrative only and are for the purpose of teaching those skilled in the art the general manner of carrying out the inventions. It is to be understood that the forms of the inventions shown and described herein are to be taken as examples of embodiments. Elements and materials may be substituted for those illustrated and described herein, parts and processes may be reversed or omitted, certain features may be utilized independently, and embodiments or features of embodiments may be combined, all as would be apparent to one skilled in the art after having the benefit of this description. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an" element or "a" element includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. References to selection from a range includes the end points of the range.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A method, comprising:
    obtaining a resist deformation model for simulating a deformation process of a portion of a pattern in resist, the resist deformation model including a fluid dynamics model configured to simulate an intrafluid force acting on the resist;
    performing, by a hardware computer system and using the resist deformation model, a computer simulation of the deformation process to obtain a deformation of a developed resist pattern for an input pattern to the resist deformation model; and
    producing electronic data representing the deformation of the developed resist pattern for the input pattern.

2. The method of claim 1, wherein the fluid dynamics model is based on Navier-Stokes flow equations.

3. The method of claim 1, wherein the intrafluid force relates at least to surface tension.

4. The method of claim 1, wherein the input pattern is provided to the resist deformation model in the form of an image of the input pattern.

5. The method of claim 4, wherein the image is a binary image.

6. The method of claim 1, wherein the electronic data representing the deformation is an image of the deformed developed resist pattern.

7. The method of claim 1, wherein the deformation is determined at a plurality of locations, each location corresponding to a point that lies on a boundary of a developed or open portion of the developed resist pattern for the input pattern.

8. The method of claim 1, wherein the resist deformation model is specified for at least two liquids in the resist pattern, wherein each of the at least two liquids has a different viscosity.

9. The method of claim 1, wherein the resist deformation model is specified for a boundary liquid layer located at a boundary between the resist and a developed or open region in the resist pattern, wherein the boundary liquid layer has a width smaller than the width of the resist at the boundary.

10. The method of claim 1, wherein the resist deformation model has specified therein a material layer at an upper surface of the resist, the material layer having a different viscosity than the resist or a remaining portion of the resist.

11. The method of claim 1, further comprising configuring, based on the electronic data representing the deformation, a physical patterning process associated with the input pattern.

12. The method of claim 11, further comprising exposing a substrate using the configured physical patterning process.

13. A non-transitory computer program product comprising machine-readable instructions, the instructions, when executed by a hardware processor system, configured to cause the hardware processor system to at least cause performance of the method of claim 1.

14. A method, comprising:
    obtaining a resist deformation model for simulating a deformation process of a portion of a pattern in resist, the resist deformation model including a fluid dynamics model having defined therein a region of material at a boundary of a resist and a developed or open region, the region at the boundary having a width smaller than the resist at the boundary;
    performing, by a hardware computer system and using the resist deformation model, a computer simulation of the deformation process to obtain a deformation of a developed resist pattern for an input pattern to the resist deformation model; and
    producing electronic data representing the deformation of the developed resist pattern for the input pattern.

15. The method of claim 14, wherein the model has defined therein, on a side of the region at the boundary wherein the side is located opposite, across the region at the boundary, of the developed or open region, another material that does not deform or deforms less than the material of the region at the boundary.

16. The method of claim 15, wherein the material of the region at the boundary comprises liquid, the other material comprises a liquid and the viscosity of the material of the region at the boundary is less than the viscosity of the other material.

17. The method of claim 14, wherein the model has defined therein, on a side of the region at the boundary wherein the side is located opposite, across the region at the boundary, of the developed or open region, a boundary condition that tantamount specifies at that location no deformation or less deformation than the material of the region at the boundary at that location.

18. The method of claim 14, wherein the resist deformation model has specified therein a material layer at an upper surface of the resist having a different viscosity than the resist or a remaining portion of the resist.

19. The method of claim 14, further comprising configuring, based on the electronic data representing the deformation, a physical patterning process associated with the input pattern.

20. A non-transitory computer program product comprising machine-readable instructions, the instructions, when executed by a hardware processor system, configured to cause the hardware processor system to at least cause performance of the method of claim 14.

* * * * *